US009880989B1

(12) United States Patent
Cadabam et al.

(10) Patent No.: US 9,880,989 B1
(45) Date of Patent: Jan. 30, 2018

(54) DOCUMENT ANNOTATION SERVICE

(71) Applicant: Amazon Technologies, Inc., Reno, NV (US)

(72) Inventors: Nagesh Pradhan Cadabam, Sunnydale, CA (US); Chetan Rao, Mountain View, CA (US); Wei Lien Stephen Dang, Mountain View, CA (US); Sean Krishan Sharma, San Jose, CA (US); Noah Eisner, Menlo Park, CA (US); Kevin Fowler, Costa Mesa, CA (US)

(73) Assignee: Amazon Technologies, Inc., Reno, NV (US)

( * ) Notice: Subject to any disclaimer, the term of this patent is extended or adjusted under 35 U.S.C. 154(b) by 24 days.

(21) Appl. No.: 14/274,361

(22) Filed: May 9, 2014

(51) Int. Cl.
G06F 17/00 (2006.01)
G06F 17/24 (2006.01)

(52) U.S. Cl.
CPC .................. *G06F 17/241* (2013.01)

(58) Field of Classification Search
CPC ................................. G06F 17/241
See application file for complete search history.

(56) References Cited

U.S. PATENT DOCUMENTS

| 6,336,124 | B1 * | 1/2002 | Alam | G06F 17/2229 |
| | | | | 707/E17.006 |
| 7,747,943 | B2 * | 6/2010 | Bargeron | G06F 17/241 |
| | | | | 345/619 |
| 7,962,846 | B2 * | 6/2011 | Lerner | G06F 17/241 |
| | | | | 715/230 |
| 8,276,061 | B2 * | 9/2012 | Joshi | G06F 17/241 |
| | | | | 715/230 |
| 9,026,900 | B1 * | 5/2015 | Pugh | G06F 17/24 |
| | | | | 715/227 |
| 2002/0116420 | A1 * | 8/2002 | Allam | G06F 17/212 |
| | | | | 715/273 |
| 2010/0278453 | A1 * | 11/2010 | King | G06Q 10/10 |
| | | | | 382/321 |
| 2011/0010397 | A1 * | 1/2011 | Kathpal | G06F 17/241 |
| | | | | 707/802 |
| 2014/0006919 | A1 * | 1/2014 | He | G06F 17/241 |
| | | | | 715/230 |

(Continued)

OTHER PUBLICATIONS

Sumnotes Facebook Page, posts dated Oct. 2, 2013 to Nov. 23, 2015, p. 1-12, available at https://www.facebook.com/sumnotes.*

(Continued)

*Primary Examiner* — Amelia Tapp
(74) *Attorney, Agent, or Firm* — Klarquist Sparkman, LLP

(57) ABSTRACT

Organizations maintain and generate large amounts of documentation and entities of these organizations often need to collaborate on generating and reviewing this information. There is a need to maintain and store this documentation remotely in such a way that the entities of these organizations may collaborate with each other. To ensure that entities of the organization can collaborate on documents, a document annotation service is described that converts a text-based document, such as a word processing document, to a fixed-layout document, such as a coordinate-based document. Annotations can be received on the fixed-layout document. The annotations can then be mapped to the text-based document and downloaded to a user for viewing.

17 Claims, 21 Drawing Sheets

(56) References Cited

U.S. PATENT DOCUMENTS

2014/0229318 A1* 8/2014 Natarajan ............ G06F 17/241
　　　　　　　　　　　　　　　　　　　　　705/26.5

OTHER PUBLICATIONS

Adobe, Adobe Acrobat XI Classroom in a Book, Adobe Press, Nov. 29, 2012, cover page and p. 211-212, 3 pages.*
"How to print or export annotations in a pdf file?" Ask Different, p. 1-4, available at http://apple.stackexchange.com/questions/13562/how-to-print-or-export-annotations-in-a-pdf-file.*

* cited by examiner

DOCUMENT ANNOTATION SERVICE

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Using cloud computing or other networks, computers of an organization may communicate with computers in the same organization or with other organizations to access and/or provide documents or other data. Within an organization, to access the documents or other data, a document management system can be used. The document management system includes a central repository and typically supports controlled access, version tracking cataloging, and search capabilities for multiple users to access a document. However, ensuring access to the documents can be challenging, especially given the multitude of different computing systems. For example, computers of the organization may include personal computers, tablets, smartphones, laptops and other devices. And providing a uniform look and feel across such diverse platforms is difficult. For example, a challenge occurs with document annotations. An annotation is a note or comment associated with a part of a document to provide related information. The annotations are typically displayed as a highlight of text or other objects (e.g., images) within the document, with associated written comments. The annotations can be received in a document in one format, such as an image format (e.g., pdf), and cannot be displayed in another documents or in a different formats, such as word processing documents.

BRIEF DESCRIPTION OF THE DRAWINGS

Various embodiments in accordance with the present disclosure will be described with reference to the drawings, in which.

DETAILED DESCRIPTION

Figure 1:
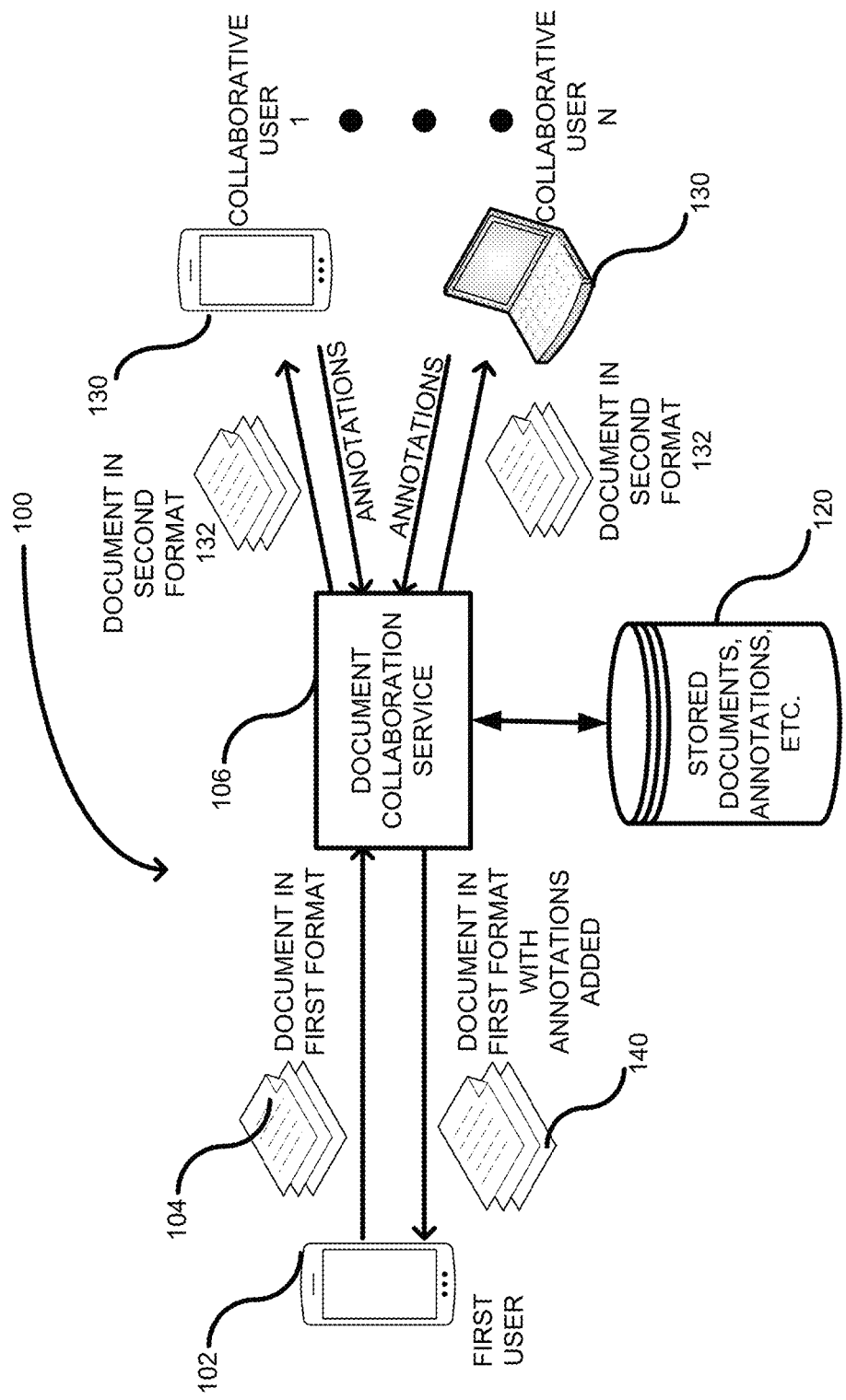
FIG. 1 shows an overall system diagram of a document annotation service.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for document management and document annotation systems. Document collaboration between users of an organization's computer systems may be enhanced by allowing a first user of a document in a text-based format, such as a Document Object Model (DOM)-based format (e.g., word processing documents, such as Microsoft Word®) to upload the document to a document annotation service. The text-based format can be a format that allows text to be customized, such as changing fonts, sizing, colors, etc. The service can convert the document into a fixed-layout format, such as a coordinate-based format (e.g., portable document format (PDF)), and allow other users to generate annotations for selected words and objects in the converted document. Then, the service can download the document to the user, who receives the original text-based format with the annotations inserted therein.

The document in the fixed-layout format may also be referred to as an underlay. Furthermore, if the document in fixed-layout format (either natively or once it has been converted) is above a certain size it may be compressed, split into one or more documents, converted to another file format, the resolution of the document may be lowered or any other suitable technique for reducing the document's size may be used before the coordinate map is generated based at least in part on the document. In various embodiments, users may transmit documents to remote computing resources operated by a compute service provider (also referred to simply as a service provider). The service provider may, if the document is not already in a fixed-layout file format, convert the document to a fixed-layout format. For example, a user may create a document on a computer system of an organization and transmit the document to the service provider to enable remote storage of the document and collaboration on the document with other users of the organization. The compute service provider can then convert the document into a fixed-layout version using one or more services or systems of the service provider. The service provider may then create a coordinate map based at least in part on the document in the fixed-layout format and the Cartesian (or other) coordinate system of the fixed-layout file format. The generated coordinate map (also referred to as an annotation index) may be used for displaying user selections and annotations in the uploaded document. In various embodiments, the coordinate map may be a separate file from the document or may be included as information in the document. For example, the coordinate map may be stored in the document converted to the fixed-layout format.

Users of the organization may request to view the document(s) from the service provider using one or more computing devices, such as a tablet, smartphone, laptop, desktop, electronic book reader, workstation or any other suitable computing device. The service provider may then, as a result of the request, transmit the document, the generated coordinate map and any other data associated with the document to the computing device from which the user transmitted the request. The coordinate map may include one or more files indicating the position of each word in the document. For example, XY coordinates, such as a bottom-right coordinate and a top-left coordinate, can be used to define a bounding box around the word. The fixed-layout format file can contain a device independent coordinate system that may be used to display the file on a variety of platforms. In various embodiments, other data associated with the document includes comments, annotations or selections made by one or more users. Other data associated with the document may be combined into a single file (also referred to as an overlay) for use in displaying collaborations between users.

Once received by the computing device of the user, the computing device may display the document and the other data associated with the document based at least in part on the overlay, the coordinate map and the underlay. For example, the coordinate map may provide the coordinates for each word in the document and the overlay may provide the annotations to the documents created by various users and the location of the annotations relative to the coordinates of the words in the coordinate map. The user may then collaborate on the document, such as by making selections and providing annotations to the document displayed to the user. The user's interactions with the document may be captured by the computing device and stored locally until the user submits the document to the service provider for remote storage. For example, the user may select a group of words from the document using a cursor controlled by a pointing device, such as a mouse. Once the user has made a selection and the computing device has determined that the user has completed the selection, the user may be prompted to perform one or more other actions, such as providing a comment or selecting a highlight function. The selection of words and actions performed by the user may be stored locally and the computing device may capture one or more other user interactions with the document. Once the user has completed collaboration on the document, the user may submit the document to the service provider for storage by selecting the submit operation. The computing device may then execute a batch job which transmits the locally saved user interactions to the service provider.

The batch job may include the underlay, the coordinate map and overlay along with the saved user interactions. Once received by the service provider, the service provider may store the document as a new version and update data corresponding to the document information. For example, the service provider may update the version information corresponding to the document. Saving each newly uploaded document as a new version of the document may include determining if any changes were made to the document, generating new underlays and overlays for the document, updating one or more search indexes corresponding to the document and notifying collaborators and owners of the document that a new version has been uploaded. Furthermore, local versions of the document may be preserved such that changes made to the document stored remotely will not be reflected in the local documents until the user has uploaded their local files and updated the local client. The user may also select a previous version of the document to roll back to. Each new version of the document may be assigned a new version identification number but retain that same document identification number. Saving each newly submitted document as a new version of the same document and preserving local files until they are submitted facilitates collaboration on the document without the need to use other files to manage conflicts between document versions.

In various embodiments, the saved user interactions include location coordinates for the words selected by the user and annotations associated with the location coordinates. This information may be stored separately as a new version of the overlay in a storage system maintained by the service provider, or may overwrite a previously stored version of the overlay or may be stored in the document itself. One or more databases may be used to record information corresponding to the underlay, coordinate map and overlay and the database may also contain the location of the underlay, coordinate map and overlay.

The user's documents, including the underlay and overlay corresponding to the documents, may be processed by one or more systems or services of the service provider to enable document collaboration between different users on different devices in a homogenous manner across a variety of different software and hardware architectures. The service provider may convert all the documents to a document format which uses a device independent coordinate system to describe the surface of a page in the document. The documents may then be processed by the service provider as a stream of text in order to determine the location coordinates of each character. Each character's location may be determined by creating a bounding box around the characters. The service provider may then determine a bounding box for each line of the document. Based at least in part on the line bounding boxes and the character bounding boxes, the service provider may determine bounding boxes for the words in the document. Determining the bounding boxes for all the words in the document allows for selected text comments and annotations to be displayed in a uniform way across multiple different devices. The service provider processing normalizes the documents so that they can be displayed in an identical manner across a variety of different platforms and avoid load on the computing devices of the user. The coordinate map enables consistent display of the information contained in the overlay across multiple computing devices with different display characteristics, such as different resolutions, different display sizes, different aspect ratios and any other differences between the displays of the multiple devices. When used by the computing device to display the document, the coordinate map causes the annotations to be displayed in connection with the same words regardless of the display characteristics of a particular display that displays the overlay and document.

The user that uploaded the document can then download the same document from the service provider with the annotations inserted therein. In order to map the insertions into the text-based format, the service provider can obtain some coordinate information associated with the document in text-based format. Obtaining such coordinate information is well-known in the art and can be accomplished using commercially available conversion software. However, the coordinate information is often limited and can include generic coordinates for a line and/or a paragraph without providing detailed character-level coordinates. Different mapping strategies can be used for inserting the annotations based on the situation. For example, a simple mapping can be used for highlighted text associated with the fixed-layout format document (the highlight is actually stored as an overlay) which exactly matches text in the text-based document. When such a match is found, the same words can be highlighted in the text-based document and any comment can be associated with those words.

In one mapping strategy, the text-based document may not support highlighting of certain objects. In such a case, the document annotation service can highlight matching words and bypass highlighting of objects which are not highlightable. In other mapping strategies, a selected region of the fixed-layout document might only partially include a word or object. A mapping to the text-based document can then include either not highlighting the partially selected word or object or highlighting the entire word or object. Such a determination can be based on a percentage that the word or object that is within the selected region. Another mapping strategy can relate to selection of a region that does not include any objects or words. In such a case, a determination can be made where to insert a corresponding comment in the text-based document based on a relationship between the selected region and a nearest paragraph. A comment can then be inserted near a top line, a bottom line or a midpoint of the paragraph. Other mapping techniques can also be used depending on the context, and the functionality of the text-based document.

FIG. 1 shows an example of an environment 100 which illustrates a customer operating a computing device 102, such as a smartphone, cellphone, tablet or computer. During operation of the computing device 102, a user may interact with the computing device and cause operations on one or more documents and/or the creation of one or more documents. The document can be in a text-based format, such as a document-object-model format (e.g., a word processing document), for which the user wishes to receive feedback from other users. The documents and operations performed by the user may be saved locally on the computing device 102. The computing device may then, as a result of a request by the user, transmit the document(s) 104 to one or more document annotation services 106 of the compute service provider. The one or more services 106 may be used by the service provider to provide services and make necessary resources available for document collaboration. The documents 104 may be newly created documents by the user on the computing device 102 or the documents may be new versions of already existing documents which the user has collaborated on. The computing device 102 may transmit, to the service provider, the document and other data corresponding to the document, such as metadata, user data, version data, underlay, overlay, comments, annotations, document identification information, coordinate map or any other data suitable for document collaboration.

Once received by the service provider, the document annotation service 106 of the service provider may process the documents. For example, the service provider can update a database 120 with information corresponding to the document 104. Various other files may be generated by the document annotation service 106 using the document 104, such as the overlay, the coordinate map and the underlay. In various embodiments, the received documents 104 are converted to a fixed-layout format (referred to as the underlay) from which the coordinate map may be created. File formats may include portable document format (PDF), an image file or any file format capable of identical display across different computing devices. The coordinate map can include bounding box data for each word in the underlay, such as XY coordinate information for opposite corners of a box, within which the word is located. The service provider may also generate an overlay based on the data submitted with the document. The underlay and the coordinate map may be used to uniformly display annotations and other information in the documents on other computing devices. The document annotation service 106 can store the original documents, the converted document, the coordinate map generated from the converted document, the overlay created and any other data corresponding to the document in the database 120. Other data can include version history, permission, requests and any other data suitable for document collaboration.

One or more other users (1-N, where N is any number) 130 may request one or more documents 132 from the document annotation service 106. In various embodiments, documents 132 are the same as documents 104 transmitted from computing device 102, but in a modified format. To receive the documents 132, the computing device 130 (e.g., laptop, smartphone, etc.) may send a request to the service 106 of the service provider. The service provider may determine the document identifier from the submitted request and query the database 120 to determine the location of the requested document and the corresponding files. The document identifier may be a globally unique identifier for a document. The corresponding files may include the coordinate map, overlay and any metadata associated with the documents. The document annotation service may collect the files and transmit the collected files to the computing device 130.

Once the computing device 130 has received the documents 132 and corresponding files, the documents may be displayed in such a way that when displayed on computing device 130, the documents appear the same as when displayed on computing device 102. For example, the document annotation service 106 may transmit the overlay, underlay, the coordinate map and the corresponding metadata. The computing device 130 may use the coordinate map to determine where to draw the annotations stored in the overlay. Various devices may display the images differently due to different screen sizes and resolutions, but the determination of where to draw the annotations is based on a device independent coordinate system and is not affected by differences in devices.

The users 1-N can use the computing devices 130 to input additional annotations into the documents 132. Annotation data including the coordinates of the annotations together with any comments can be transmitted from the computing devices 130 to the document annotation service 106, and such annotation data can be stored in the database 120. The document annotation service can generate an annotation export file that includes the annotations. An example annotation export file can be as follows:

{Annotations:
"Author": "Pradham Cadabam"
"Comment": "Line Left"
Highlights:
{
"BR"
"x": 65.625
"y": 411.75
}
"TL"{
"x": 23.625
"y": 192.75
}
}

The "Author" field provides information about who made the annotation. The "Comment" field includes the comment made by the author. The "BR" and "TL" are the bottom right and top left XY coordinates for a bounding box associated with a highlighting of words in the document. Thus, through the annotation, the comment is associated with the highlighted words in the document. Other information can be included in the annotation export, if desired. For example, a date field, a page number field, and a unique identifier associated with the annotation can be used.

Upon request by the first user of the client device 102, the document annotation service 106 can download the first document with annotations 140. As further described below, the document annotation service 106 maps the annotations from the annotation export onto the document 104 to generate the document 140. The document 140 is also in the first format, such as a word processing format, and mapping the annotations thereon includes converting the annotations in the annotation export into a format that is compatible with the format of the document 140. Such a mapping can include a variety of strategies depending on the functionality of the first format. For example, in some instances an exact match can be found between what is highlighted in the second format 132 and what should be highlighted in the first document format 104. In such a case, the added annotations are straightforward. In other instances, the first format 104 might not support annotations made in the second document format 132. For example, highlighting of only part of an image, or highlighting of certain characters (e.g., bullet points) or highlighting empty regions might not be supported in the first document format. A strategy can be followed to transform the annotation from the second document format to the first document format in order to adapt the annotation into the first format. The document 140 with the annotations inserted can also be available to the collaborative users 130.

Figure 2:
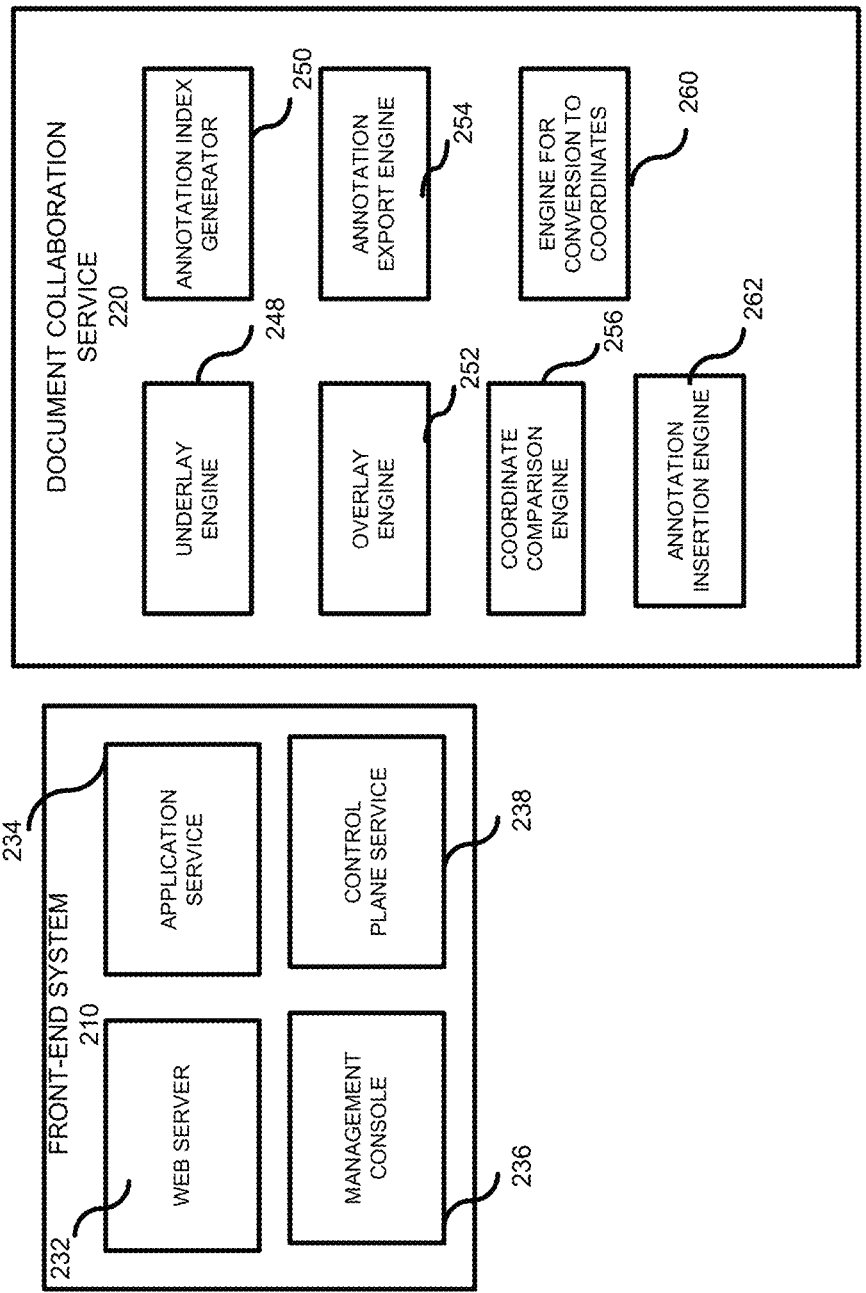
FIG. 2 shows an illustrative example of an environment in which various embodiments of the present disclosure may be practiced, with different potential engines within the document annotation service of FIG. 1.

FIG. 2 shows an environment 200 which illustrates an example of the functional entities of the front-end system 210 and the document annotation service 220 in accordance with at least one embodiment. The front-end system 210 can include a web server 232, an application service 234, a management console 236 and a control plane service 238. The web server 232 may enable the execution of a web site, a single-page web application or a single-page interface that permits a user to transmit or upload documents to the document annotation service 220. The web server 232 may further enable the user to download and edit documents in the first format. The web server 232 may also enable an administrator or a user to set permissions or share modes that specify the privileges given to a user in accessing documents. In addition, the web server may enable users or devices to submit authentication credentials. Although one web server 232 is described with reference to FIG. 2 it may be contemplated that multiple web servers of any type may be used, whereby a portion of the web servers may be redundant.

The application service 234 may be a collection of computing devices and other resources collectively configured to serve as a user-exposed service that receives requests from the user and services the requests. A user request may be made using a website or a management console accessible to the user or a client that is executed on a user's device and may make service requests on behalf of the user. The request may be an API function call and the application service 234 may process the request and manage its execution. The application service 234 may cause the synchronous execution of actions associated with a received request or alternatively may cause one or more actions that require more complex processing to be queued for asynchronous execution. The application service 234 may also be responsible for receiving user credentials and request authentication of the user from an authentication service.

The management console 236 may be a collection of computing devices and other resources collectively configured to permit organizations, administrators and users to register for utilizing the document annotation service 220. The management console 236 may be used in addition or as an alternative to a website or an application running on a user device and may permit users and administrators to make service requests using appropriately configured API function calls. For example, the management console 236 may be used for inviting a user to join a document annotation service and view and collaborate on documents. Further, the management console 236 may be used for allowing dashboard access, audit log access, permission setting (for example, for administrators and users), storage limit setting (for example, for organizations and users) and security setting (for example, password and encryption). The control plane service 238 of the front-end system 204 may be a collection of computing devices and other resources collectively configured to serve as an interface that enables creating new computing instances for document collaboration and management.

The document annotation service 220 can include an underlay engine 248, an annotation index generator 250, an overlay engine 252, an annotation export engine 254, a coordinate comparison engine 256, an engine for conversion to coordinates 260, and an annotation insertion engine 262. The underlay engine 248 can convert a document from a text-based format (i.e., the DOM-based format) to a fixed-layout format. Such a conversion is well-understood in the art and can include conversions from a word-processing format to a PDF. The annotation index generator 250 can extract each word and/or object from the fixed-layout format and generate a file (e.g., JSON file) that contains bounding boxes and the associated coordinates of the bounding boxes for each word in the fixed-layout format. The overlay engine 252 can be used to generate the overlay for displaying annotations in association with the underlay on the client devices. The annotation export engine 254 can be used to extract annotations from a database and provide coordinate information for each annotation in the form of an annotation export file, as described above. The engine for conversion to coordinates 260 can use well-known conversion programs to provide general coordinates of a text-based document. For example, coordinates of paragraphs or lines can be provided. The coordinate comparison engine 256 can compare coordinates from the annotation export with coordinates from the text-based format to determine if the coordinates overlap. Such an overlap is used to identify a location of where to insert an annotation in the text-based document. The annotation insertion engine 262 can analyze the context of annotations made in the fixed-layout document and determine which strategy to use to insert the annotations into the text-based document.

Figure 3:
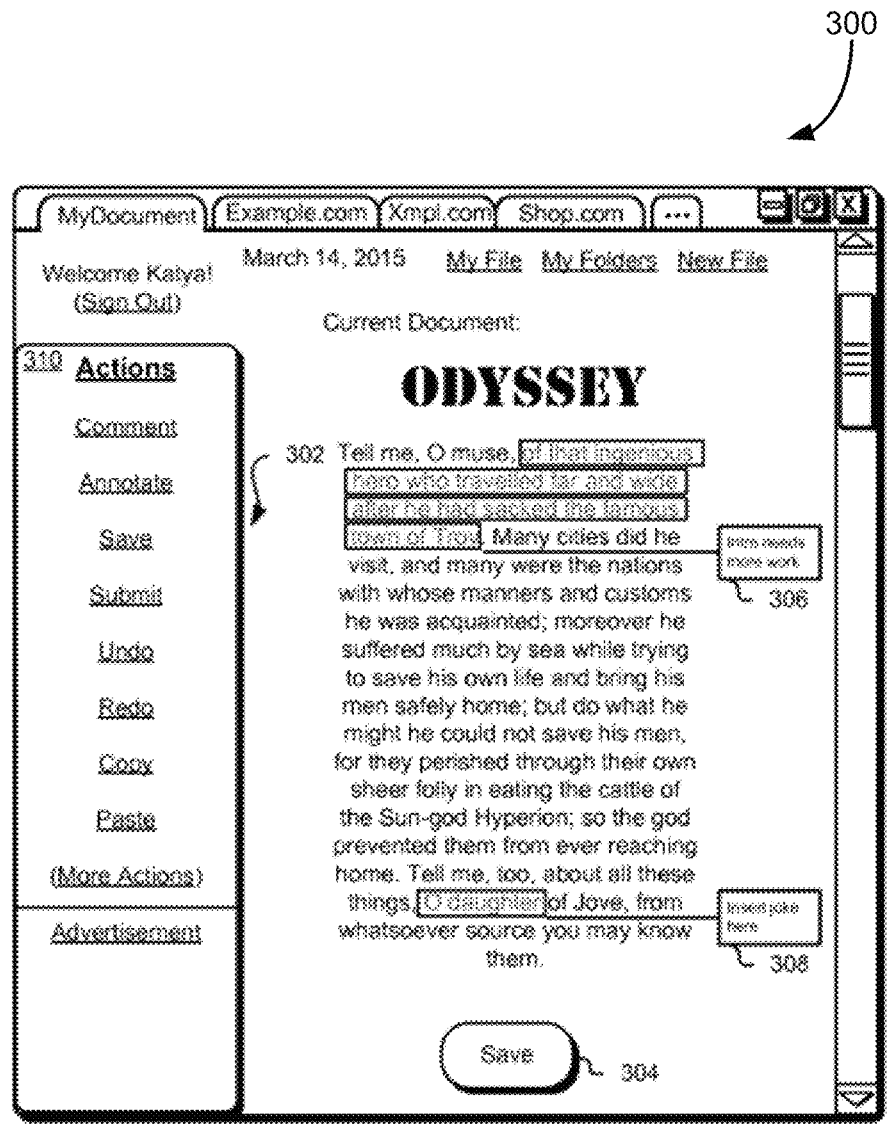
FIG. 3 shows a diagram illustrating a web page in accordance with various aspects of the present disclosure.

FIG. 3 is an illustrative example of a webpage 300 which may be used to provide URLs in accordance with various embodiments. As illustrated in FIG. 3, the webpage 300 includes various content. The content illustrated in the webpage 300 is illustrative in nature and the type and appearance of content, as well as the amount of content, may vary in accordance with various embodiments. For example, the webpage may be provided over a network to an application such as a browser application of a client and can display a document in a second format, such as document 132 (FIG. 1). The webpage 300, however, may be provided generally by any suitable device capable of receiving and processing a webpage. While a webpage 300 is used for the purpose of illustration, URLs or other resource locators configured in accordance with the various embodiments described herein may be provided with content in various ways in accordance with various embodiments. For example, content may be provided to a particular application of the client such as a synchronization client, which is not necessarily classified as a browser application. Generally, any way by which URLs or other resource locators may be provided to be within the scope of the present disclosure.

As illustrated in FIG. 3, the webpage 300 includes various graphical user interface elements that enable navigation throughout a website of which the webpage 300 is a part. The user interface of webpage 300 may be presented in various ways, such as a smartphone or tablet application. In this example, the webpage 300 is part of an enterprise level document annotation service. For instance, on the left-hand side of the webpage 300, various links 302 to various actions 310 that may be performed on the document may be displayed. In this example, the links appear as textual words which enable the links to be selected using an appropriate input device such as a keyboard, mouse, touchscreen or other input device. Selection of one of the links 302 may cause an application of the webpage 300 to be displayed, to submit, pursuant to a URL associated with the selected link by the programming of the webpage 300, an HTTP request to a server that provided the webpage 300 or another server.

In this example, the webpage 300 also includes a graphical user element configured as a save button 304. The save button 304 may be a graphical user interface element of the webpage 300 where the underlying code of the webpage 300 is configured such that selection by an input device of the save button 304 causes information corresponding to the document and/or user interaction with the document to be saved locally.

The webpage 300 may cause display of some or all of the current document. The user may be interacting with the document using one or more appropriate input devices. For example, a user may highlight a portion of text with a mouse and select the annotate link from the actions 310 on the left-hand side. This may prompt the user to enter annotations associated with the selected text. The selected text and associated annotations 306 and 308 may be displayed on the webpage 300. A user may save annotations, comments and highlighted text by selecting the save function. By selecting the save function the user's interactions with the document may be written to local memory such as a hard disk drive. In various embodiments, user interactions are being periodically saved to local memory and saved as a draft. User collaborations on the document may also be stored remotely with the service provider. For example, a user may collaborate on a document and upon completion submit the document to the service provider in order to be stored remotely, such as in the database 120. When a user selects to submit a document, the user's computing device may generate a batch job including the underlay, overlay, coordinate map, annotations, metadata and any other information suitable for processing of the document by the service provider. For example, the user's computing device may generate a hash of the files to be transmitted to the service provider for remote storage. The service provider may use the hash of the files to determine if any changes were made to the file. Furthermore, when the computing device is connected to the document annotation service over a network (e.g., the Internet) the user's interaction with the document may be saved directly to the document annotation service without first being persistently stored in local memory. The user's interactions may be visible only to the user until the user publishes their interactions with the document. Publishing the document may cause user interactions with the document stored as drafts by the document annotation service to become visible to one or more other users with permissions to access the document.

During interaction with the document displayed by webpage 300 it may be possible for another user to interact with and submit edits to the same document from another device. The system may save the latest received document as the most recent version of the document.

While the user is editing the document, the interactions that are saved locally may be preserved if even another version of the document is submitted during this time. Once the user has submitted the locally saved edits to the document, the system may generate a new version of the document based at least in part on the document submitted by the user and update the document and corresponding information saved locally based at least in part on any previous versions of the document not accounted for locally during the time the user was editing the document.

Figure 4:
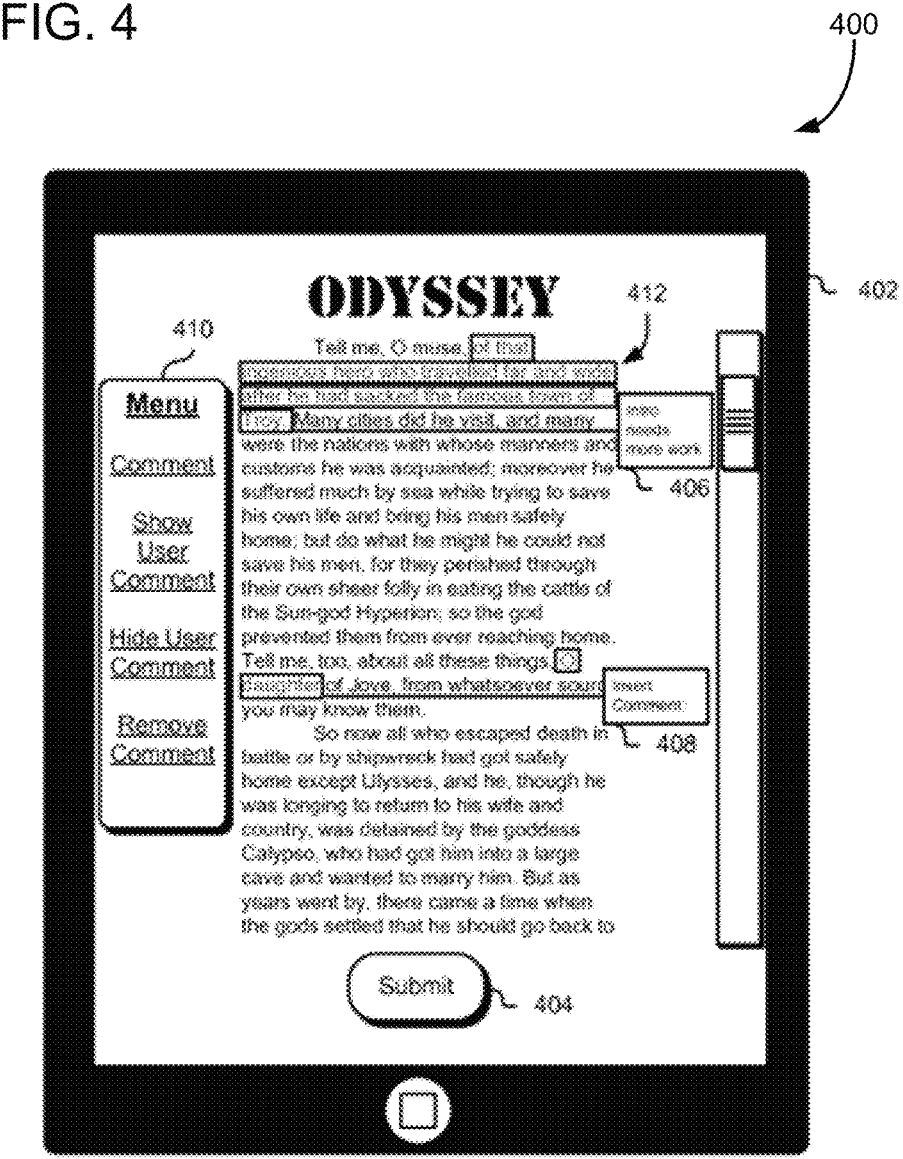
FIG. 4 shows a diagram illustrating a client application in accordance with various aspects of the present disclosure.

FIG. 4 is an illustrative example of a client application 400 which may be used to edit and create documents for use with the document annotation service operated by the service provider. The client application may be executed by a computing device 402 such as the computing devices described above with reference to FIG. 1. Returning to FIG. 4, the client application 400 may be responsible for displaying documents, capturing user interactions with the documents, transmitting documents and corresponding information to one or more systems of the service provider, maintaining local copies of documents and corresponding information, retrieving documents and corresponding information from one or more systems of the service provider, synchronizing local documents with documents stored remotely from the device by the service provider and any other operation suitable for enabling document management and collaboration.

The content illustrated in the client application 400 is illustrative in nature and the type and appearance and amounts of content may vary in accordance with various embodiments. The client application 400 may be provided in various ways in accordance with various embodiments. For example, the client application 400 may be provided over a network to the computing device 402 such as an application browser of the computing device.

As illustrated in FIG. 4, the client application 400 includes various graphical user interface elements that enable navigation throughout the document annotation service of which the document 412 is a part. In this example, the client application 400 is part of an enterprise level document annotation service including various interfaces for creating, editing and collaborating on various documents. For instance, on the left-hand side of the client application 400 various menu options 410 are provided, allowing actions to be performed on various documents. In this example, the links appear as textual words which enable the menu options 410 to be selected using an appropriate input device such as a keyboard, mouse, touchscreen, or other input device. Selection of a menu option 410 may cause the client application 400 to execute one or more instructions stored in the memory of the computing device 402 causing performance of the selected menu option. For example, the user may select menu option 410 "Show User Comment," this selection by the user may cause the computing device 402 to display a list of users that have provided comments to document 412. Using the appropriate input device, one or more users may be selected from the list and the highlighted words and associated comments are then displayed. In this way, the client application 400 may display all or a portion of the comments and annotations in a document.

Client application 400 may also be used to insert comments or annotations 408 into a document. A user of the computing device 402 may receive a request from another user to collaborate on a document. The request may be received by client application 400 and the corresponding document and associated data may be retrieved by the client application 400 from a remote storage system operated by the service provider such as the storage system. The client application 400 may also be used to browse or view documents stored on the remote storage system of the service provider. Documents stored by the service provider may have one or more associated permissions, the permissions may control not only access to the document by particular users but also what documents are visible to a particular user when browsing via the client application 400. In this manner a user may search for and select a document for editing. In various embodiments, the client application 400 provides a search option for the user. The user may then enter a keyword or other information and search the documents stored in the storage system operated by the service provider. Once the user has determined a document for editing, the one or more systems of the service provider may determine a location of the document and associated data and transmit the location information to the client application 400. The one or more systems of the service provider may also transmit the documents and associated data directly to the client application 400.

The client application may display the document 412 using the data retrieved from the remote storage system including the underlay, coordinate map and overlay. In various embodiments, the underlay contains the document converted into the fixed-layout format with a device independent coordinate system used for displaying the document and the overlay contains the coordinates of user-selected text and associated annotations. Using this information and information contained in the coordinate map, the computing device 402 determines which coordinates to use when drawing the highlighted bounding boxes around the selected text in the document and displaying the associated comments 406.

The user may then continue to interact with the document and enter more annotations as described above. The user may scroll down using a scroll bar or some other input method. The user may also zoom in or zoom out of the document 412. This may cause the client application 400 to redraw the document 412. Redrawing the document may change the size and amount of text shown on the screen, but does not affect the coordinates of the word bounding boxes in the coordinate map.

In this example, the client application 400 also includes a graphical user element configured as a submit button 404. The submit button 404 may be a graphical user interface element of the client application 400 where the underlying code of the client application 400 is configured such that selection by an input device of the submit button 404 causes information corresponding to the document and/or user interaction with the document to be transmitted to the service provider for remote storage. The client application 400 may transmit the document, the underlay, coordinate map overlay, a hash of the files transmitted, document identification information, user authentication information and any other information suited for document collaboration.

Figure 5A:
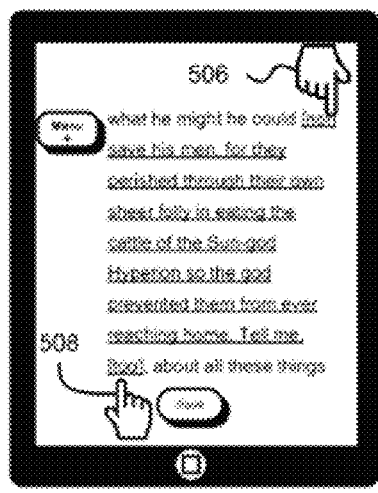
FIG. 5*a* shows a diagram illustrating a client application in accordance with various aspects of the present disclosure.
Figure 5B:
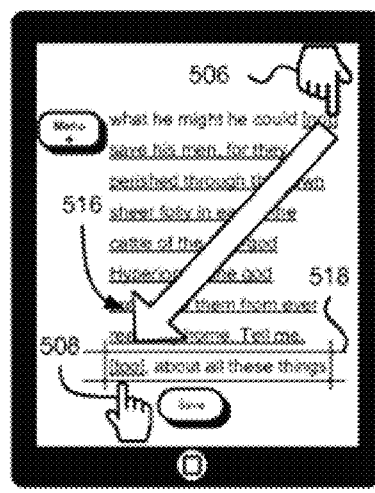
FIG. 5*b* shows a diagram illustrating a client application in accordance with various aspects of the present disclosure.
Figure 5C:
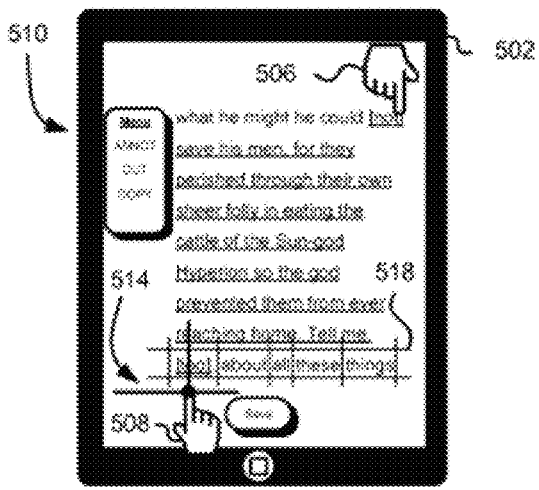
FIG. 5*c* shows a diagram illustrating a client application in accordance with various aspects of the present disclosure.

FIGS. 5*a*, 5*b* and 5*c* show illustrative examples of a document displayed to a user on a computing device 502. Once the document is displayed by the client application, the user's interactions with the document may be captured by the computing device 502. For example, using an input device such as a touchscreen, the user may begin a selection of text by placing a finger on the desired start word 506. The example used herein is illustrative in nature and the process described may be performed using any appropriate pointing device capable of determining screen coordinates on a computing device such as a mouse or drawing tablet. Returning to the example, the client application may capture the position of the user's finger as a single point in the document by at least converting the start position of the user's finger from screen coordinates to coordinates in the device independent coordinate system used in the document. The client application will then search the coordinate map to determine if that point is inside a word bounding box. If the point is not within a word bounding box as defined in the coordinate map, the client application may begin a region selection. If the client application begins a region selection, the start word 506 used for the text selection may be the word first captured by the region selection bounding box.

If the point is within a word bounding box as defined by the coordinate map, the client will begin a text selection, using the word in which the selection start point is located as the starting word of the selection. While the user drags a finger across the screen, as illustrated by arrow 516, the client application may continuously translate screen coordinates into document coordinates, calculating and highlighting the selected words based at least in part on the coordinate map as the user continues to make the text selection. The user may then end the text selection by removing a finger from the screen and the client application may then determine an end word 508 for the text selection by at least converting the screen coordinates to document coordinates and searching the coordinate map for the corresponding word. If the user ended the text selection on a word, the client application determines the start word 506 and the end word 508 based at least in part on the coordinate map. If the user does not end the text selection inside a word bounding box as defined by the coordinate map, the client application may determine the end word 508 using a variety of techniques alone or in combination.

The client application may take the document coordinates of the end point and determine an end word 508 by determining the closest vertical line in the document to the end point and selecting the closest word on that line horizontally from the endpoint. Another technique may include selecting the closest word either vertically or horizontally whichever is closer. From the end point, the closest word may also be found by taking the sum of all horizontal and vertical distances, also known as the taxi cab distance. The closest word may also be found using standard Euclidean distance calculation. Distance to a word may be calculated using the top-left coordinate and bottom-right coordinate of the word bounding box. Similarly the distance to a line may be calculated using the top-left coordinate and the bottom-right coordinate of the line bounding box 518. For example, if the end location of the cursor is not within a word bounding box as defined by the coordinate map, the client application may determine the nearest horizontal line to that point and then based at least in part on the determined horizontal line determine the nearest word on that horizontal line in order to determine the end word for the user selection.

When using a coordinate system, the nearest line may be found by calculating the Euclidean distance from the coordinates of the end point to the coordinates of the line bounding box. For example, for each line bounding box 518 in the coordinate map, if the abscissa of the end point is less than the abscissa of the top-left point for a particular bounding box, subtract the abscissa of the end point from abscissa of the top-left point of the line bounding box, if the abscissa of the end point is greater than the abscissa of bottom-right point of the line bounding box, then the abscissa of the end point may be subtracted from the abscissa of bottom-right point of the line bounding box. This process is then repeated for the ordinate, then the resultant values for both the abscissa and the ordinate are squared and the square of the resultants are then added together, for each line bounding box in the coordinate map. The nearest line is determined by the minimum of the distances calculated for each line bounding box 518 in the coordinate map. The client application may find the nearest line by:

If (x<top-left.x) xdistance=x-top-left.x If (x>top-left.x) xdistance=top-left.x-x If (y<top-left.y) ydistance=y-top-left.y If (y>top-left.y) ydistance=top-left.y-y distance=(xdistance)$^2$+(ydistance)$^2$ line=min(distance$_1$ . . . distance$_N$)

Once the nearest line has been determined, the end word 508 may be determined by finding the nearest word to the end point on the determined nearest line based at least in part on the line bounding box 518. This may be done by calculating the Euclidean distance from the end point to each word on the line. The nearest word is the minimum of the distances calculated, as illustrated by the crosshairs 514 shown in FIG. 5 *c*. The client application may find the nearest word by:

distance=(x1−x2)$^2$+(y1−y2)$^2$ and word=min(distance$_1$ . . . distance$_N$)

Once the client application has determined an end word 508, information corresponding to the start word 506 and end word 508 may be stored locally. The information may be saved locally without a synchronous user operation. Furthermore, the client device may render the display of the document such that the start word 506, end word 508 and the words between the start word 506 and end word 508 are offset or distinguished from the rest of the document, shown as an underline in FIGS. 5*a-c*. The underline as shown in FIGS. 5*a-c* is for illustrative purposes and the display of the document may be altered to distinguish the selected text in various ways in the different embodiments such as highlighted text, highlighted rectangles, italics or any other display capable of distinguishing the selected text.

In various embodiments, the client application draws a rectangle around the start word and end word including the word in between in order to display the text selection generated by the user. The client application may draw the rectangle based at least in part on the top-left coordinate and the bottom-right coordinate of the rectangle to be drawn. If the start word 506 and the end word 508 are on the same line then top-left coordinate of the rectangle is the top-left coordinate of the start word 506 and the bottom-right coordinate is the bottom right coordinate of the end word 508. If the start word 506 and the end word 508 span multiple lines in the document, as illustrated by FIGS. 5*a-c*, a rectangle may be drawn for all the intermediate lines in the document. In the example illustrated by FIGS. 5*a-c*, the client application draws, based at least in part on the coordinate map, the rectangle using the top-left coordinate of the start word 506 and the bottom right coordinate of the line bounding box containing the start word 506. Then client application draws, based at least in part on the coordinate map, a rectangle on the line between the start word 506 and the end word 508 using the top-left coordinate and the bottom right coordinate of the line bounding box for the particular line in the document. Finally, the client application draws, based at least in part on the coordinate map, the rectangle on the last line using the top-left coordinate of the line bounding box for which the end word 408 is found and the bottom right coordinate of the end word 508.

Once the client application has distinguished the selected text from the rest of the document, the client application may prompt the user for information associated with the selected text. The prompt may include a list of commands displayed in a pop-up or other type of menu 510. The menu as illustrated by FIGS. 5*a* and 5*b* may be collapsed or partially hidden during operation of the computing device 502. The commands may include operations to be performed on the text such as highlight, bold, italic, cut, copy, paste or some other operation to be performed on the selected text itself. The menu may further include commands that may associate information with the selected text such as author information, date and time information, annotations to the selected text or any other information that may be associated with the selected text. For example, the user may make a selection of text in the document; the client application may capture this selection, underline the selected text based at least in part on the captured selection and display a menu of commands 510 to the user. The user may select the annotation command displayed by the client application and the client application may provide an interface for the user to enter annotations associated with the selected text. The client application may then store the start word 506, end word 508 and associated comments or annotations. The client application may save this data in a new overlay file or may add the data to the overlay retrieved from the service provider.

Figure 6:
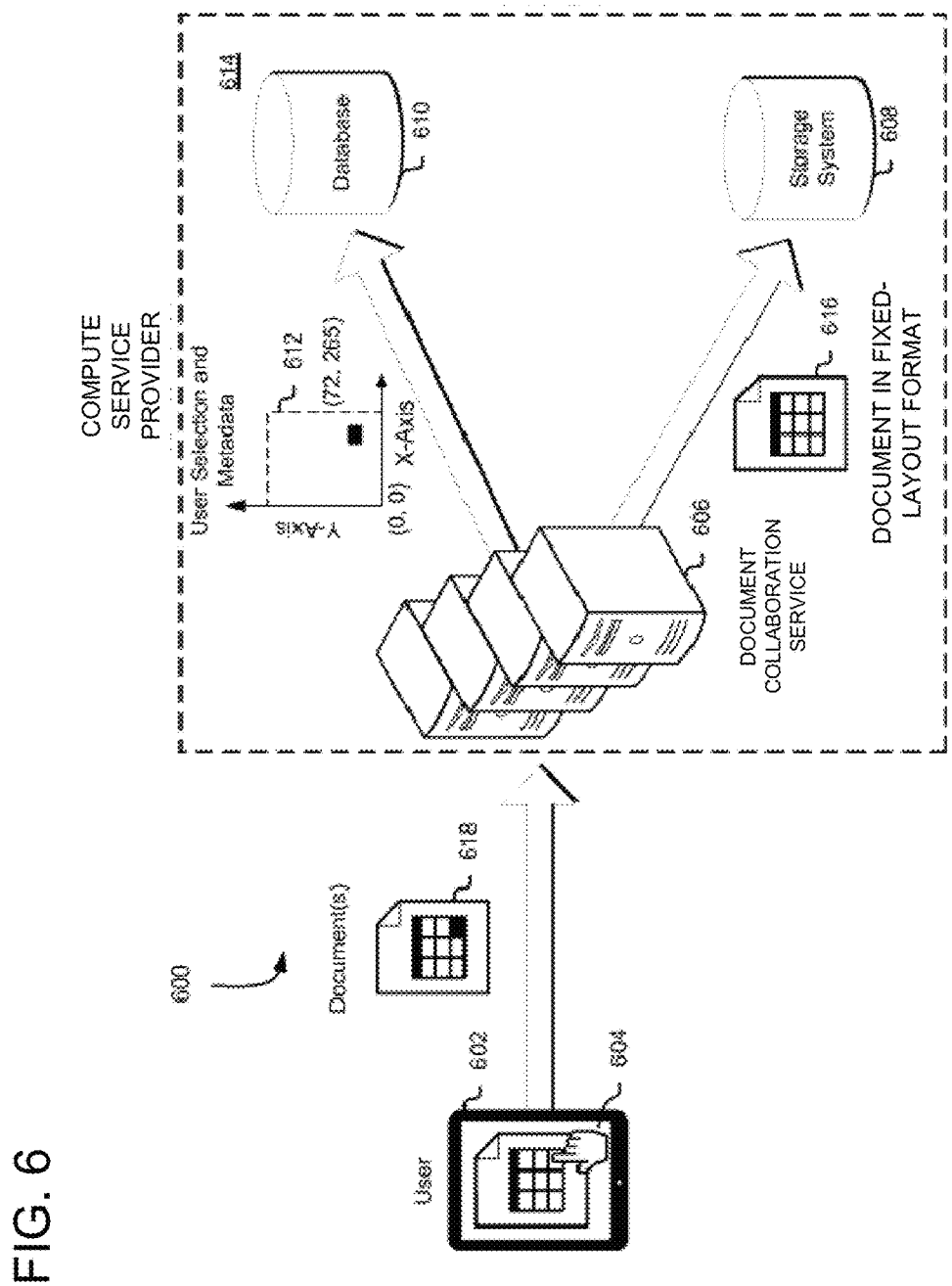
FIG. 6 shows a diagram illustrating document management in accordance with various aspects of the present disclosure.

FIG. 6 shows a diagram illustrating document management in accordance with various aspects of the present disclosure. In particular, FIG. 6 shows environment 600 which illustrates an example of a user operating a computing device 602 such as a smartphone or tablet. The user may have collaborated on the document by providing a selection and associated annotation 604. The document may have been created by the user or may have been created by another user. The other user may have requested collaboration on the document. Collaboration on the document may include activities such as selection of text 604 and the creation of and/or modification of annotations corresponding to the selection. Once the user has collaborated on the document, the user may then submit the document to the service provider. Submission of the document to the service provider may include the computing device 602 transmitting the document 618 and associated data to the document annotation service 606. The associated data may include created and/or modified annotations, comments, text selection or any other collaborative actions performed in the document.

In various embodiments, the transmitted files are received by one or more other systems of the service provider and are directed to the appropriate system. For example, the service provider may operate one or more listening devices on a network responsible for receiving requests from users of the service provider and directing the requests to the appropriate system. These other systems may first cause the documents 618 and associated data to be stored in the storage system 608 of the service provider and provide notification to the document annotation service 606 that documents 618 and associated data have been stored in the storage system 608. For example, a listening device may receive a request from the user to process documents 618 and associated data. The listening device may then cause the document 618 and associated data to be stored in the storage system 608. After the document 618 and associated data has been stored in storage system 608, the listening device may transmit a notification including a URL to the location of the stored file to the document annotation service 606. Upon receiving the notification from the listening device the document annotation service 606 may download the documents 618 and associated data based at least in part on the URL included in the notification. The document annotation service 606, the database 610 and the storage system 608 may be located in one or more data centers 614 of the service provider.

The documents 618 and associated data may include the document in the file format it was originally received by the document annotation service 606, annotations created by the user, a hash of the documents, a hash of the associated data, an overlay, an underlay, a coordinate map, a timestamp or any other information suitable for document collaboration. Furthermore, the documents 618 and associated data may be provided by an API call to the service provider. Once received by the document annotation service 606, the document annotation service may determine if the documents 618 have been changed. If the documents 618 have been changed, the documents can be saved as a new version of the documents 618. However, if the documents 618 have not been changed, they may not be processed and overhead from processing the files may be reduced.

The document annotation service 606 may determine if the documents 618 and/or the associated data has changed in a variety of different ways. For instance, the hash submitted with the documents 618 and associated data may be compared with a hash of a previous version of the documents and any associated data corresponding to the particular version of the document in order to determine if a change has been made. The hash may further include all or a portion of the file path to determine if a change has been made to the directory structure. In another example, an inverted bloom filter may be used to determine if a change has been made in the document.

Once it is determined that a change has been made to the documents 618 and/or the associated data, a new version of the document may be stored based at least in part on the documents 618 and associated data transmitted by computing device 602. Information corresponding to the document such as user selection of text in the document and corresponding metadata 612 may be written into a database 610 entry corresponding to the document. The user selection of text and corresponding metadata 612 may include metadata corresponding to the document and the particular version of the document. Furthermore, the information corresponding to the document may be based at least in part on the document 618 and data associated with the document as transmitted by the computing device 602. For example, a new version identification number may be generated and written into the database 610 along with the raw coordinate of the user's selection of text and associated annotations. Other information such as a Uniform Resource Locator (URL) for the documents 618 may also be written into the database. The annotations or changes submitted by the user may also be stored in the database 610. In various embodiments, the database 610 contains the raw coordinates for the user selection and only the documents in fixed-layout file format 616 are stored in the storage system 608. After the information in the database has been updated, the document annotation service 606 can store the new versions of the documents 618 and associated data.

The document annotation service 606 may retrieve the documents 618 and associated data from the storage system 608 of the service provider or the document annotation service may have received the documents 618 directly from the computing device 602. The document annotation service 606 may receive the underlay, the coordinate map and overlay from the computing device 602 and associate the underlay, the coordinate map and overlay with a new version of the document. If the documents 618 as received are not in the fixed-layout format, the document annotation service may covert the documents 618 to a fixed-layout format and generate the associated coordinate map. Along with the underlay and coordinate map, one or more thumbnail images of the documents may also be generated.

The document annotation service 606 may store the annotations and/or comments included in the documents 618 and associated data when saving the new version of the document. As described above, the annotations to a document may be stored in a separate file which may contain both the annotations and the coordinates of the user selected text associated with the annotations. This information may be used by a user device to draw the highlighted words and the associated comments. The document annotation service 606 may receive the user annotations and associated text selection directly from the computing device 602 from which the user enter the information or from some other service or system of the service provider. The document annotation service 606 may update the annotation index using the user annotations and associated coordinates of the user selected words based at least in part on the bounding box for each word. The text of the annotations and/or the documents 618 may be extracted in order to enable searching of the documents. In various embodiments, the extracted text is transmitted to one or more other systems of the service provider in order to update a search index which enables users to search documents stored remotely by the service provider.

After a new version of the document is stored, a notification may be sent to one or more users specified in the database. For example, the user specified as the owner or creator of the document may be notified that a new version of the document has been created. In another example, if the documents 618 and associated data were transmitted to a particular user for collaboration, the user responsible for having the documents 618 and associated data transmitted to the particular user may be notified that the requested collaborator has uploaded a new version of the document. The notification may be sent by one or more systems of the service provider and may include e-mail, SMS or any other suitable means for notifying a user.

New versions of the documents 618 and associated data may be stored by the service provider without an explicit command to make a new version of the documents 618 and associated data. For example, when a user collaborates on and/or edits a document and submits the document for storage with the service provider, the documents 618 and associated data transmitted from the user's computing device 602 to the service provider are used to store a new version of the document without an explicit command from the user to make a new version of the document. Furthermore previous versions of documents 618 and associated data may be persistently stored in one or more storage systems of the service provider until deleted by explicit command to delete or another event (e.g., an account remaining inactive for a specified amount of time).

Figure 7:
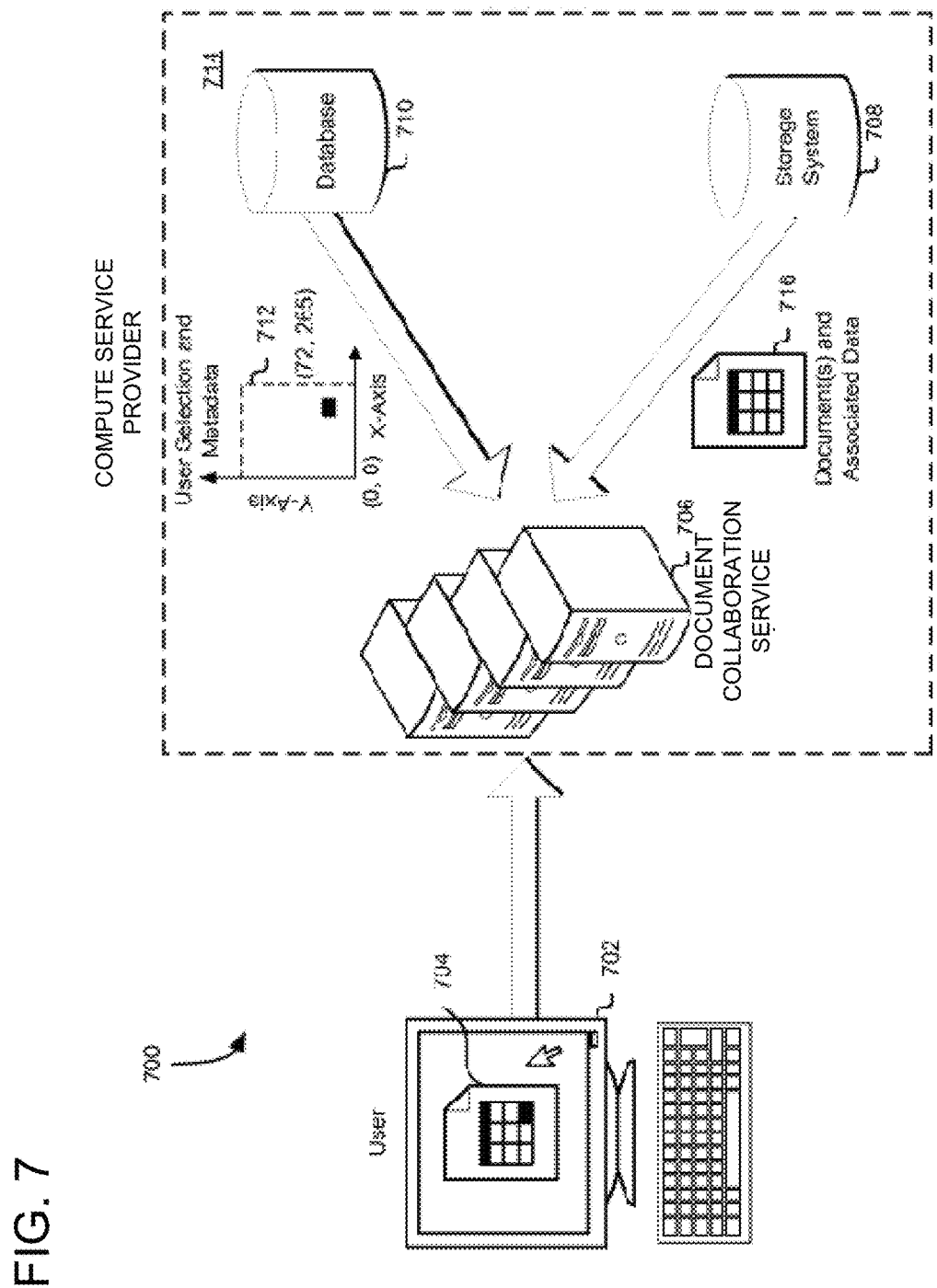
FIG. 7 shows a diagram illustrating document management in accordance with various aspects of the present disclosure.

FIG. 7 shows a diagram illustrating document management in accordance with various aspects of the present disclosure. Accordingly, FIG. 7 shows environment 700 which illustrates an example of a user operating a computing device 702 such as a personal computer or desktop computer. Using computing device 702 the user may request one or more documents 704 from the document annotation service 706. In various embodiments, the one or more documents 704 are included in a request for collaboration from one or more other users. Once the document annotation service 706 has received a request it may determine, based at least in part on the requested, one or more files to transmit to computing device 702.

The document annotation service 706 may determine the files to transmit by querying a database 710 for information corresponding to the request. For example, the request may include a document identification number or some other identifying information. The document annotation service 706 may query database 710 based on this to determine a document or a particular document version to transmit to the computing device 702. In various embodiments, a request for collaboration on a document from a user includes a specific version of the document for which collaboration is requested. Based on the results returned from the database 710 the document annotation service 706 may determine a location of one or more files to transmit to the computing device 702. For example, the document annotation service 706 may determine an underlay, overlay, coordinate map and other data associated with the document to transmit to computing device 702. This may include user selection and metadata 712 associated with the document as well as the documents themselves 716.

The document annotation service 706 may also determine a location of the files and transmit the location of the file to the computing device 702 enabling the computing device 702 to retrieve the files. The underlay and coordinate map may be stored in storage system 707 and the metadata corresponding to the document may be stored in database 710. The database 710, storage system 708 and the document annotation service 706 may be located in the same datacenter 714 or may be located in different datacenters.

Figure 8:
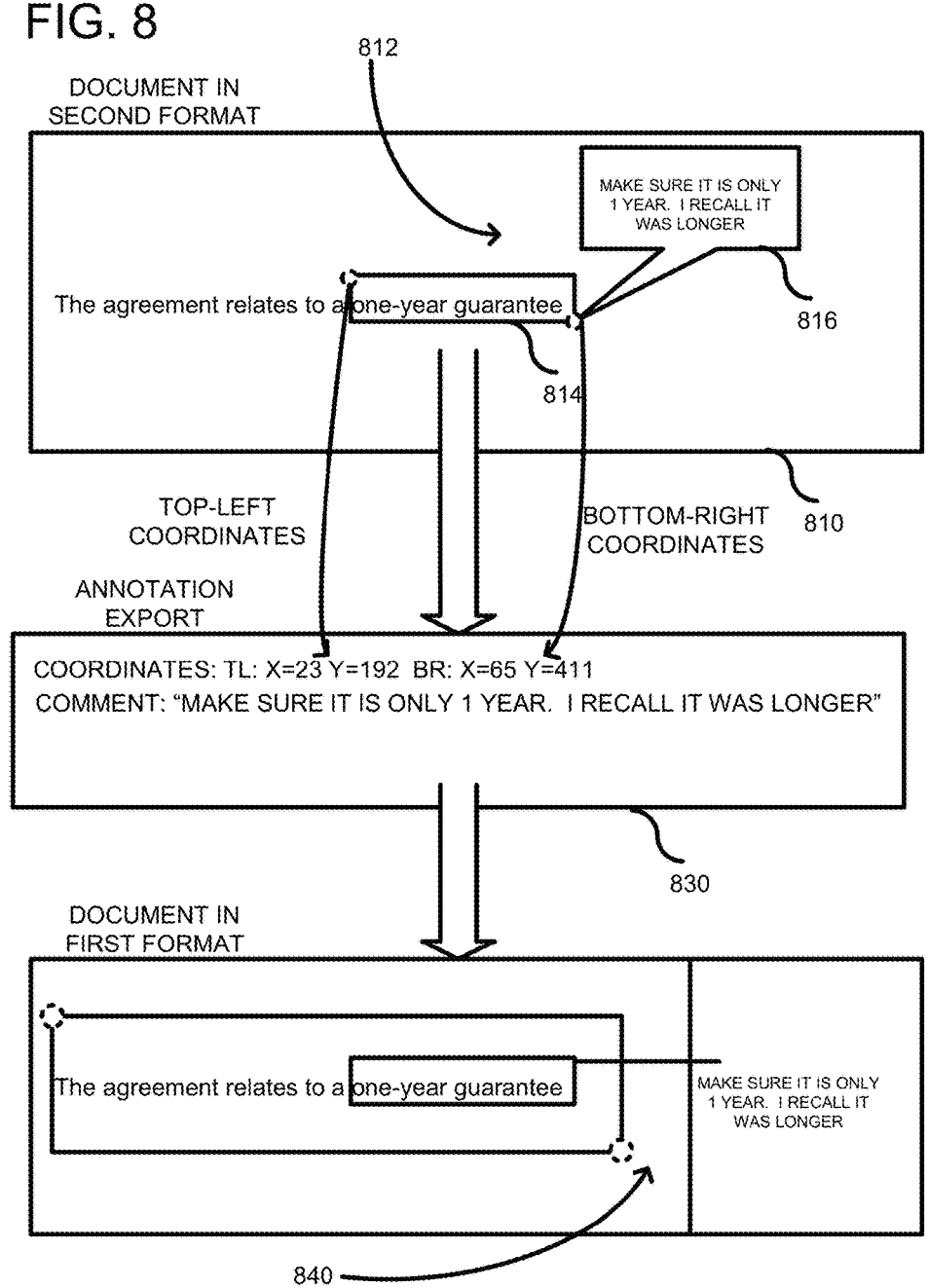
FIG. 8 shows an illustration of a first strategy for inserting annotations into a text-based document.

FIG. 8 shows an example of how the annotation insertion engine 262 can insert an annotation into the text-based format in accordance with a first insertion strategy. A document in the fixed-layout format is shown at 810 with an associated annotation 812. The annotation 812 can include a highlighted portion 814 and an associated text comment 816. Notably, the comment 816 can be in a format that differs from a format for the text-based document. For example, the comment can be in a box with a triangular-shaped arrow pointing at the highlighted text 814. Using the embodiments previously described, an annotation export 830 can be generated. As indicated, a bounding box associated with the highlighting 814 has an identified top-left coordinate and a bottom-right coordinate. The X and Y coordinates are placed in the generated annotation export together with the associated comment. Other data can also be included in the annotation export 830. The annotation insertion engine 262 can use the coordinates to determine the words that are highlighted: "one-year guarantee". Then a regular expression search can be performed in the text-based document for the same words. When a search hit occurs, coordinates of the line in the text-based document can be obtained. Additionally, the coordinates of each word in the fixed-layout document can be obtained from the annotation index. The coordinate comparison engine 256 can be used to determine if the coordinates in the fixed-layout document intersect with the coordinates in the text-based document. If so, the annotation 840, including the comment and the highlighting, can be inserted at the matched location using the format of the text-based document.

Figure 9:
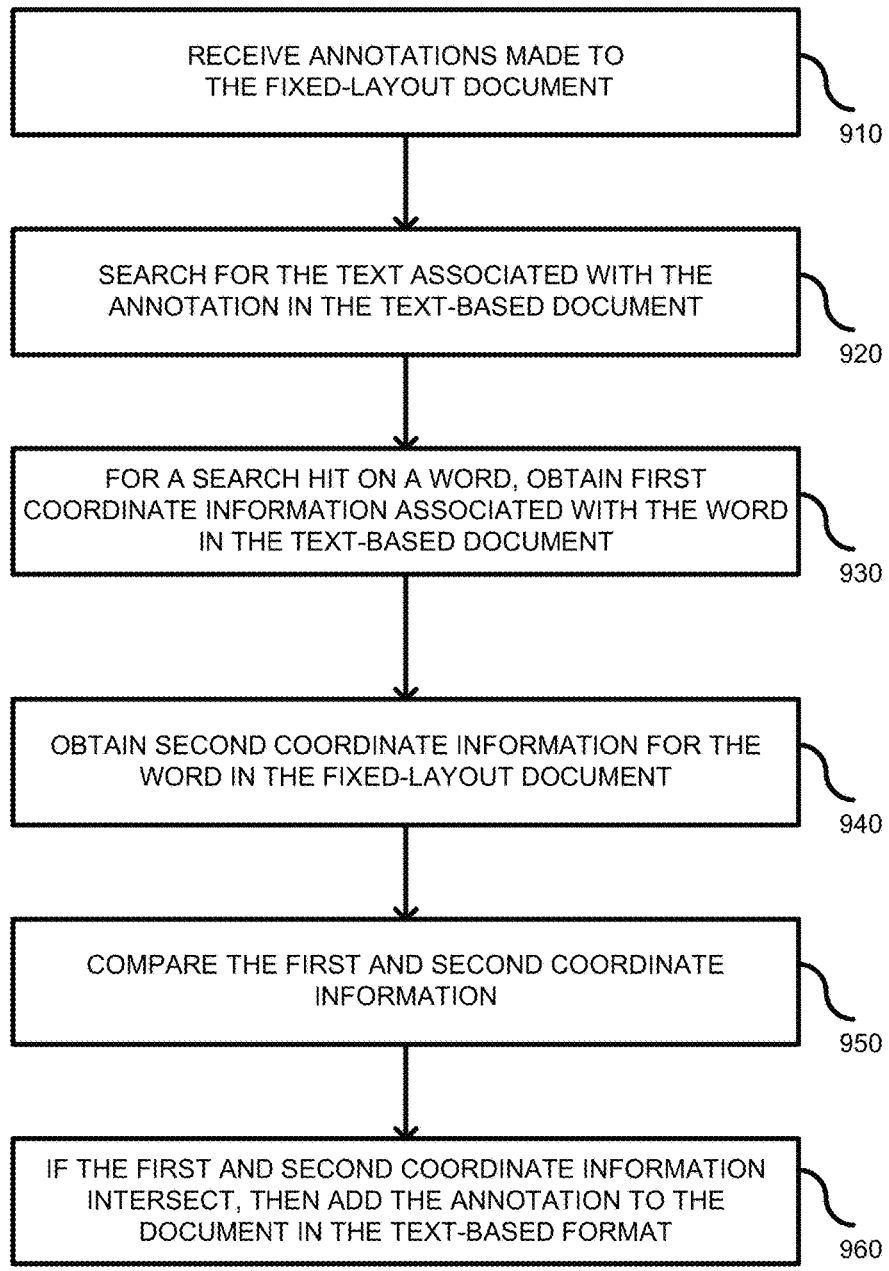
FIG. 9 is a flowchart of a method of implementing the first strategy for inserting annotations into a text-based document.

FIG. 9 shows a flowchart of a method for the first insertion strategy. Such an insertion strategy can be invoked upon receiving a request from a user to download the document 140 with the annotations inserted. In process block 910, annotations can be received for the fixed-layout document. Such techniques for the receiving annotations are described above. The annotations can include highlighted text and/or objects and associated comments, which can be new text. The annotations can be stored in a database, such as database 120 in FIG. 1. In process block 920, a search for the text associated with the annotation can be performed. For example, the highlighted text can be in an annotation export file. The highlighted text in the annotation export file can be used to perform a regular expression search in the text-based document. In process block 930, when there is a match, first coordinate information associated with the word in the text-based document can be obtained. For example, commercial products are available to provide coordinate information, such as a line or paragraph in which the word sits. In process block 940, coordinate information can also be obtained for the word in the fixed-layout document. Such coordinate information can be obtained from the annotation index. In process block 950, the coordinate information can be compared to determine whether there is an intersection. The coordinate information need not be identical, but if the coordinates define two bounding boxes, then any overlap of the bounding boxes can be considered an intersection. The coordinate comparison can be performed by the coordinate comparison engine. In process block 960, if there is an intersection, then the annotation can be added to the text-based document. The addition can include the highlighted words and the associated comment. If there is not an intersection, then process can be repeated for the same word starting from process block 920. This process can be repeated for other annotations and the resultant document can be downloaded to the user.

Figure 10:
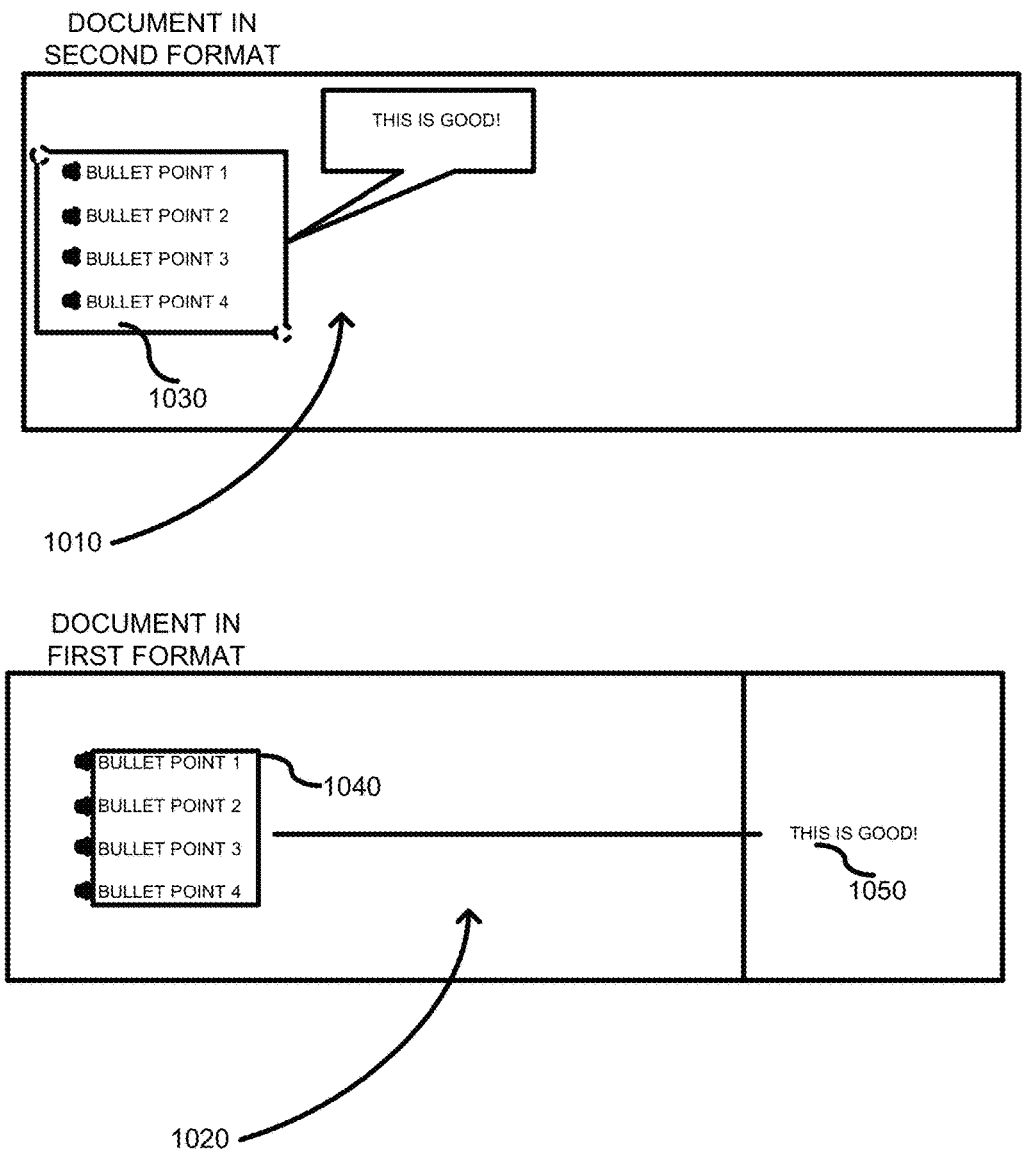
FIG. 10 shows an illustration of a second strategy for inserting annotations into a text-based document.

FIG. 10 shows an example of how the annotation insertion engine 262 can insert an annotation into the text-based format in accordance with a second insertion strategy. In this embodiment, an annotation 1010 in the fixed-layout format selects a plurality of bullet points with an associated comment field stating "this is good!". In this strategy, an exact match does not work because bullets are not highlightable as annotations in the text-based format. As a result, the annotation insertion engine 262 highlights as much of the text and objects as it can and bypasses the other objects that cannot be highlighted. Thus, a single highlighted box 1030 that includes all of the bullet points can be highlighted in the text-based format as a box 1040, with the dots associated with the bullet points bypassed. The text associated with the annotation is shown at 1050 in a format compatible with the first format.

Figure 11:
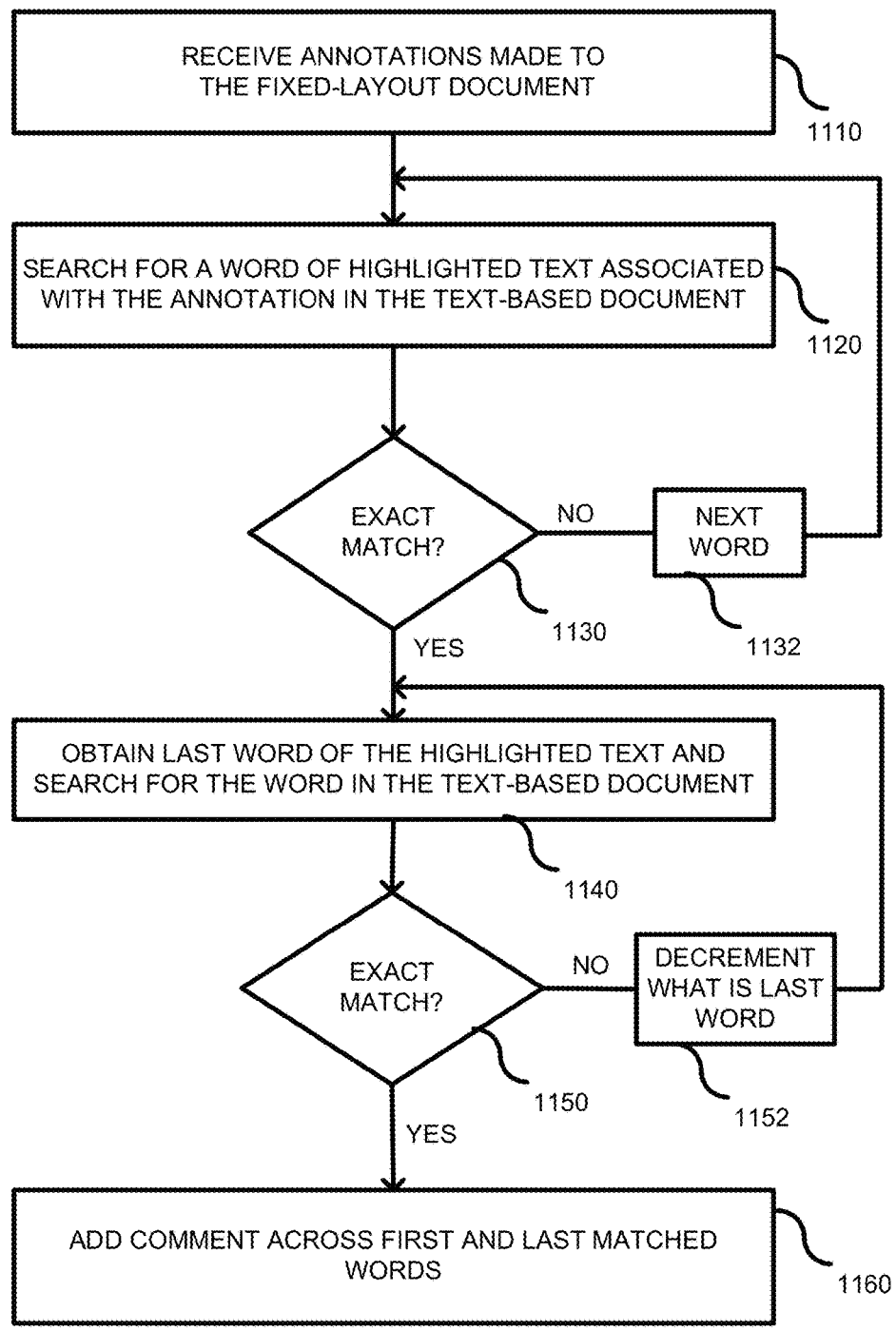
FIG. 11 is a flowchart of a method of implementing the second strategy for inserting annotations into a text-based document.

FIG. 11 is a flowchart of a method for the second insertion strategy. In process block 1110, annotations can be received that are made to the fixed-layout document. In process block 1120, a highlighted first word from an annotation can be searched in the text-based document. In decision block 1130, a determination is made whether the word found in the text-based document matches the first word. Such a search can be a string-based search. If not, then in process block 1132, a next word is used and process block 1120 is repeated. If decision block 1130 is answered in the affirmative, then in process block 1140, a last word of the highlighted text is used to search the text-based document. In decision block 1150, if the last word is not matched, then what is considered the last word is decremented in process block 1152 and process block 1140 is repeated. For example, the previous to last word is used as the last word. Otherwise, if there is a match, then in process block 1160, a comment is added across the first and last matched words by highlighting the matched words and linking the highlights to the textual comment. The formatting is accomplished in accordance with the annotation rules associated with the text-based document.

Figure 12:
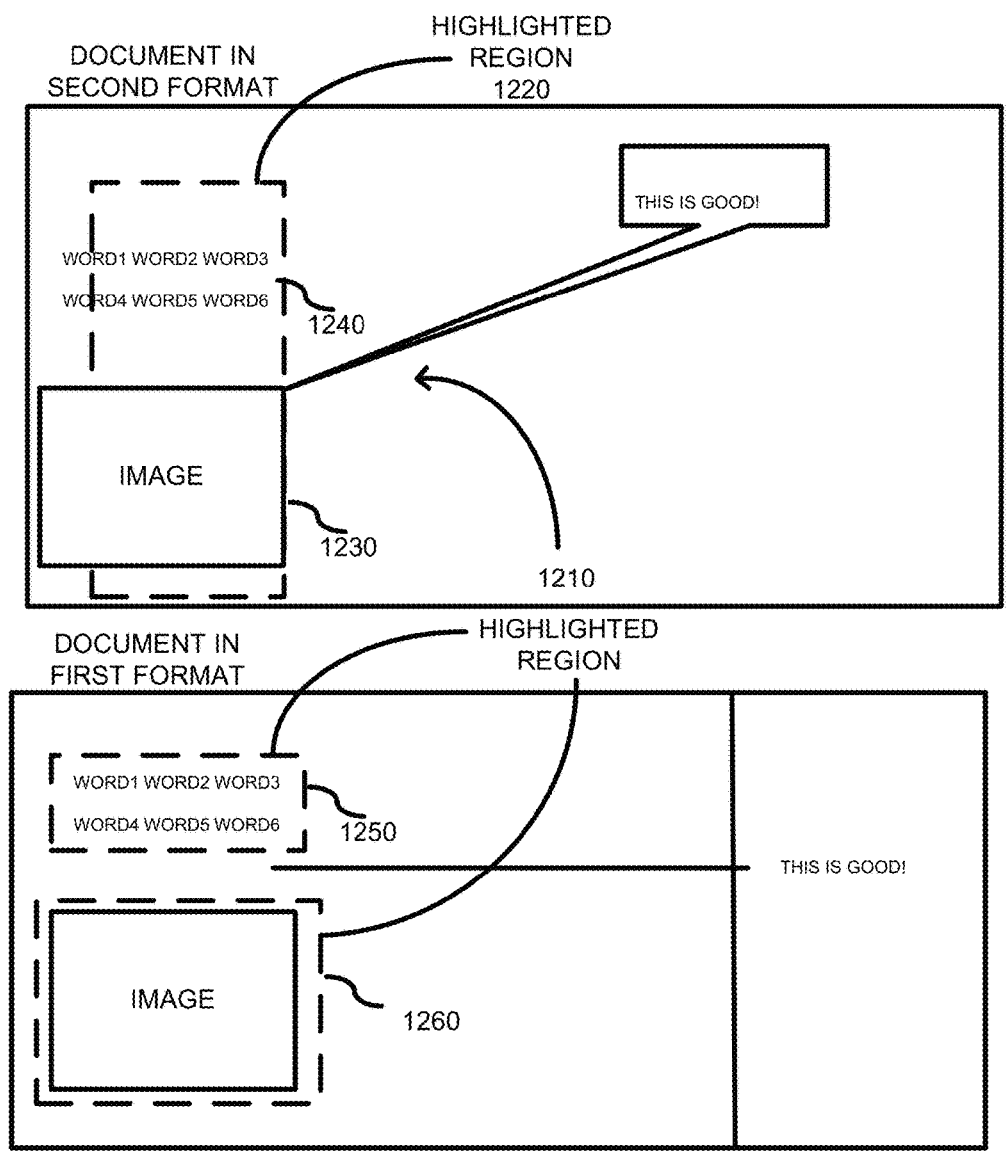
FIG. 12 shows an illustration of a third strategy for inserting annotations into a text-based document.

FIG. 12 shows an example of how the annotation insertion engine 262 can insert an annotation into the text-based format in accordance with a third insertion strategy. In this strategy, when a user highlights a rectangular region in a fixed-layout document, the rectangle might cover only a portion of a word or object (e.g., an image). The text-based document may not accept such partial annotations, so the annotation insertion engine 262 transforms the partial annotation into an acceptable format. As shown at 1210, an annotation is made in the fixed-layout format by selecting a rectangular box 1220. As can be seen, an image 1230 and some of the words 1240 (i.e., word 1 and word 4) are situated partially inside and partially outside of the region 1220. The annotation engine 262 can ensure that any partially selected object is fully included in the highlighting as shown with the highlighted text at 1250 and highlighted object at 1260. In some embodiments, a percentage of how much of a word is selected in the fixed-layout format can be used to determine whether to select the word in the text-based layout. For example, if the percentage exceeds a threshold amount, then the word is selected to be part of the annotation. Otherwise, it is not selected. Additionally, if any part of an object is selected, the entire image can be selected.

Figure 13:
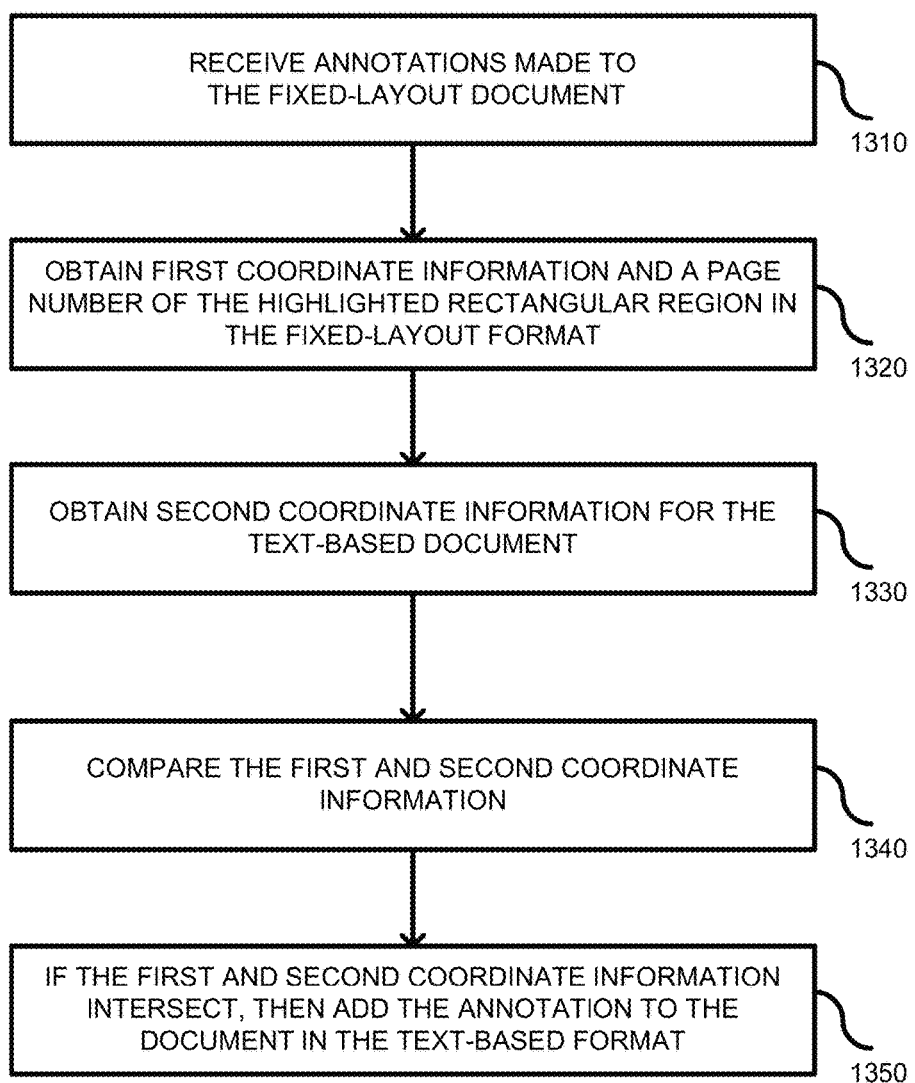
FIG. 13 is a flowchart of a method of implementing the third strategy for inserting annotations into a text-based document.

FIG. 13 is a flowchart of a method for the third insertion strategy. In process block 1310 annotations are received for the fixed-layout document. In process block 1320, first coordinate information and the page number can be obtained for the highlighted rectangular region using the annotation index. In process block 1330, second coordinate information is obtained for the text-based document. In process block 1340 a comparison is made between the first and second coordinate information to determine if there is intersection. Both sets of coordinate data can be used to define bounding boxes, and if the bounding boxes overlap, it is determined that they are intersecting. In process block 1350, if the coordinates intersect, then the word or object within the bounding box is highlighted in the text-based document.

In certain embodiments, the annotation index can be used to determine a percentage of a word that is included within the selected region. Thus, the coordinates of the selected region can be used together with the coordinates of the word to determine a percentage of the word within the selected region. If the word is more than a threshold percentage within the selected region, it can be flagged to be included in the annotation for the text-based document. Otherwise, it can be bypassed in the annotation. In FIG. 12, the words "Word1" and "Word4" are considered above the threshold level for a percentage within the region 1220. Consequently, these words are highlighted in box 1250. Additionally, the image 1260 can be shown as separate highlights than 1250, but the comment can be to both.

Figure 14:
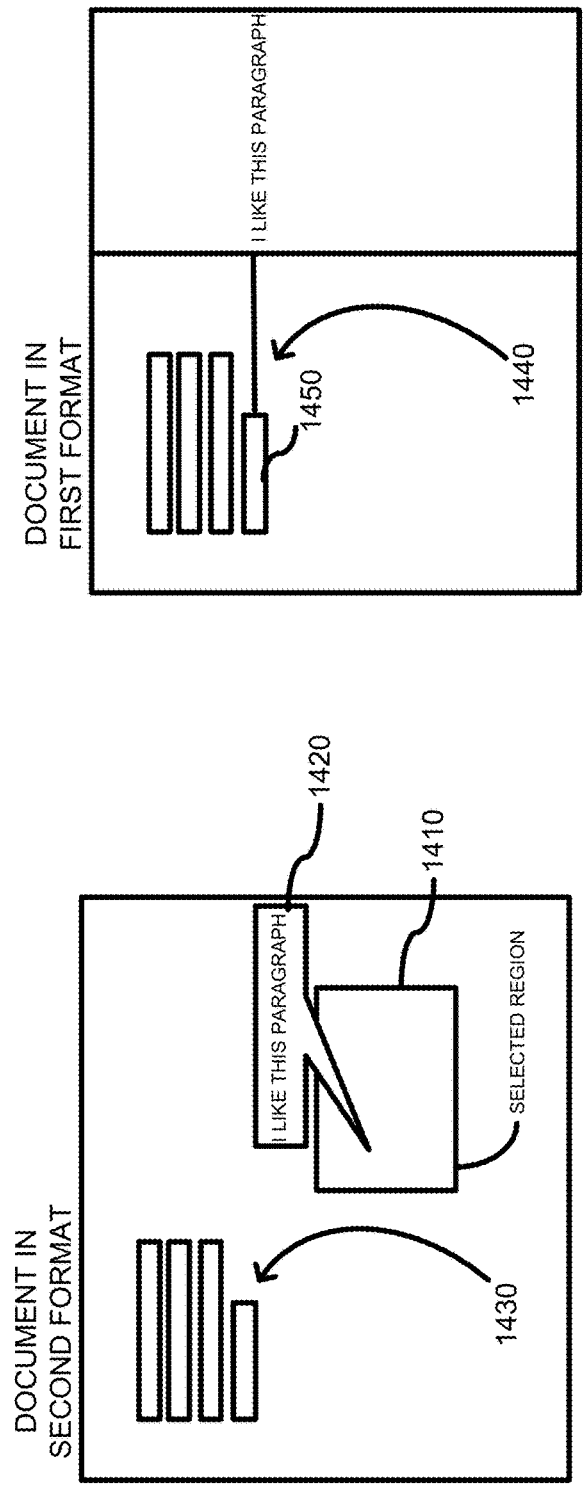
FIG. 14 shows a first illustration of a fourth strategy for inserting annotations into a text-based document.

FIG. 14 shows an example of how the annotation insertion engine 262 can insert an annotation into the text-based format in accordance with a fourth insertion strategy. In this embodiment, the strategy is used when the user draws a region on an empty space on the fixed-layout document. An empty space is a region where there are no words or objects to select to be associated with the text comment. An example selected region 1410 is shown as an empty box with an associated text comment 1420. The selected region 1410 can be situated relative to a paragraph 1430. Empty regions are typically not permitted to be annotations in text-based documents. As a result, as shown at 1440, the comment can be associated with the paragraph. However, depending on the location of the selected region in relation to the paragraph, the comment can be linked to a last line in the paragraph as shown at 1450.

Figure 15:
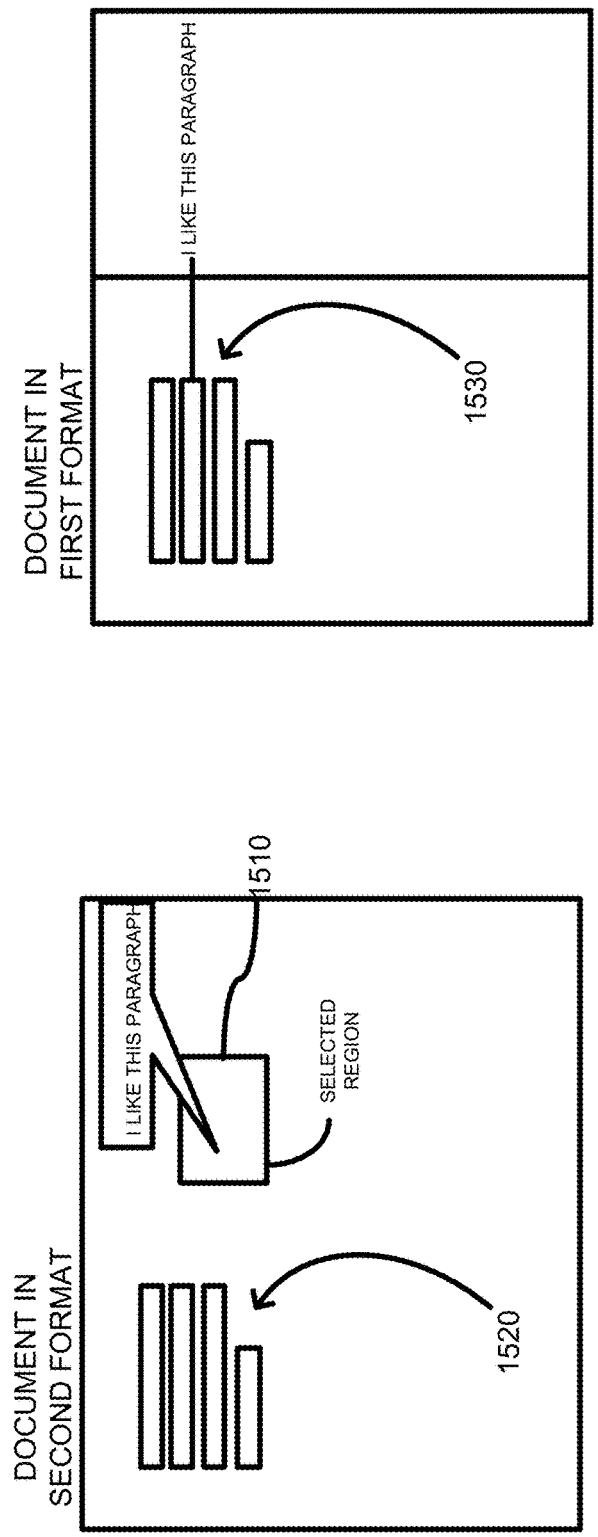
FIG. 15 shows a second illustration of the fourth strategy for inserting annotations into a text-based document.

FIG. 15 shows the selected region 1510 at a more central region with respect to the paragraph 1520. As a result, as shown at 1530, the comment is linked to a line in the paragraph that is closer to centrally located or located in the center of the paragraph.

Figure 16:
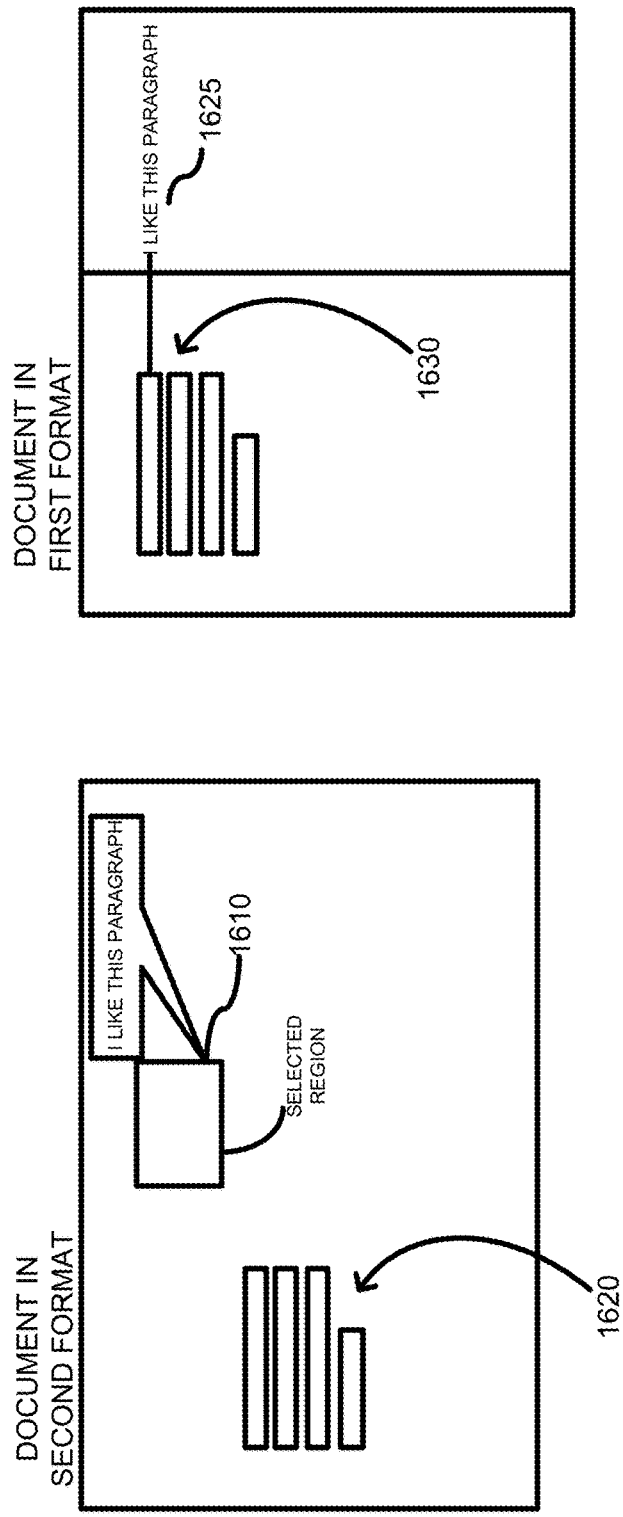
FIG. 16 shows a third illustration of the fourth strategy for inserting annotations into a text-based document.

FIG. 16 shows the selected region 1610 in a location above the paragraph 1620. In this case, the comment 1625 is aligned to a top line in the paragraph, as shown at 1630.

Thus, examples of FIGS. 14-16 show that a selected region, which is empty, can be linked to its nearest paragraph and a comment can be linked to different portions of the paragraph based on a relative positional relationship between the selected region and the paragraph. Thus, a highlight that does not contain any words or objects can be converted to a highlighted paragraph with an associated comment.

In all of the strategies, a highlight and comment in a fixed-layout document is converted to a highlight and a comment in a text-based document, while conforming to the rules for inserting comments in the text-based document.

Figure 17:
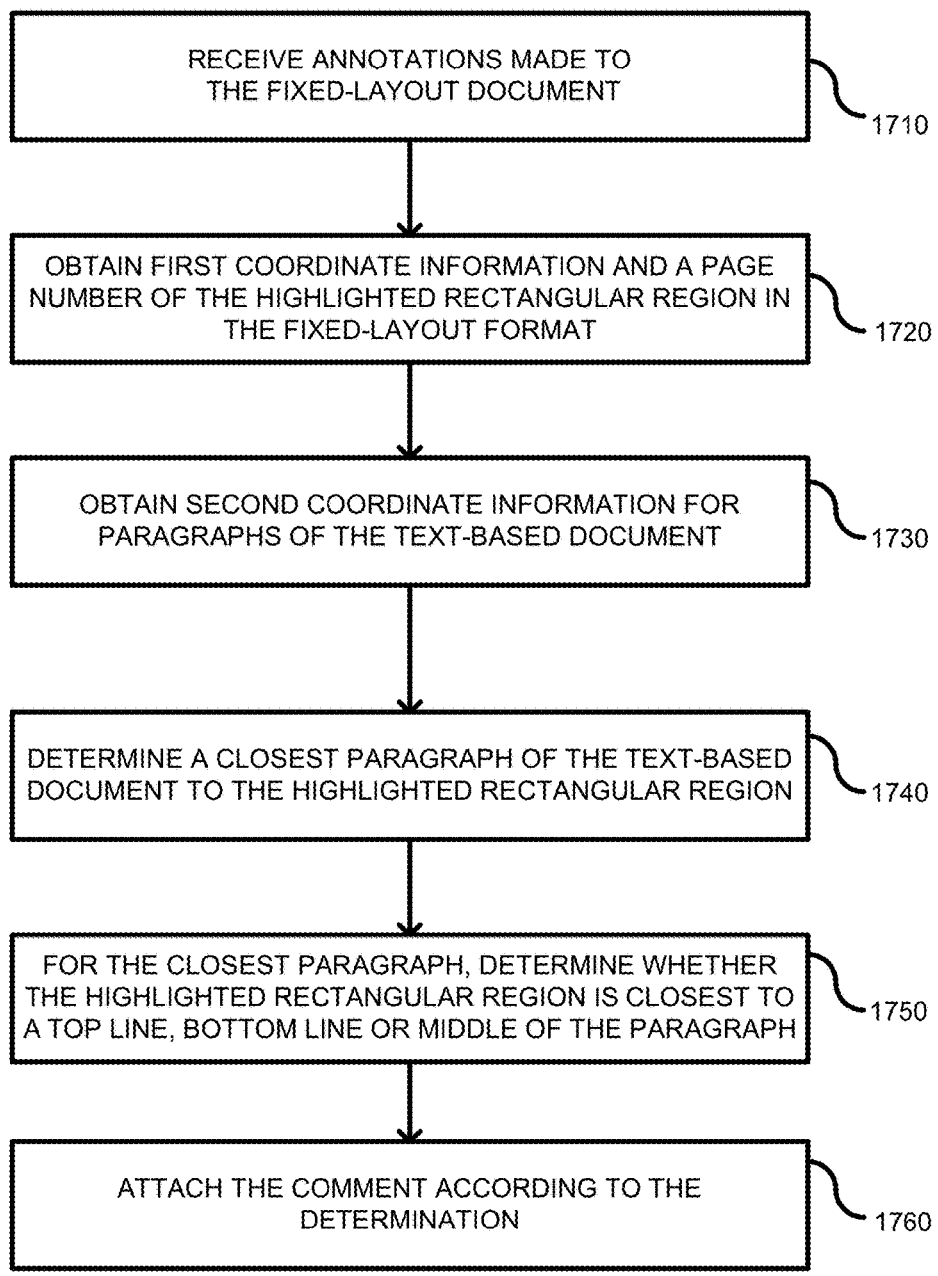
FIG. 17 is a flowchart of a method of implementing the fourth strategy for inserting annotations into a text-based document.

FIG. 17 shows a flowchart of a method according to the fourth insertion strategy. In process block 1710, annotations are received to the fixed-layout document. In process block 1720, first coordinate information and a page number are obtained for a highlighted rectangular region in the fixed-layout format. The coordinate information and page number can be obtained from the annotation index. In process block 1730, second coordinate information can be obtained for paragraphs of the text-based documents. For example, the engine 260 (FIG. 2) can use commercially available software to obtain coordinates of a text-based file, such as the XY coordinates of a bounding box encompassing the paragraph. In process block 1740, using the first and second coordinates, a determination can be made of the closest paragraph of the text-based document to the high-lighted rectangular region. The closest paragraph is one wherein a distance measurement can be obtained using the XY coordinates of a corner of the paragraphs bounding box and a corner of the highlighted rectangular region. Other distance measurements can be used, such as a center point of the paragraph and/or region. Once the paragraph is identified, a determination is made whether the highlighted rectangular region is closest to a top line, a bottom line, or a middle of the paragraph. Again, the coordinates of the paragraph can be used to make this determination. In process block 1760, a comment associated with the annotation can be attached to the selected paragraph at either a top line, a bottom line, or substantially a middle line of the paragraph depending on the relative location of the paragraph to those lines, as determined in process block 1750.

Figure 18:
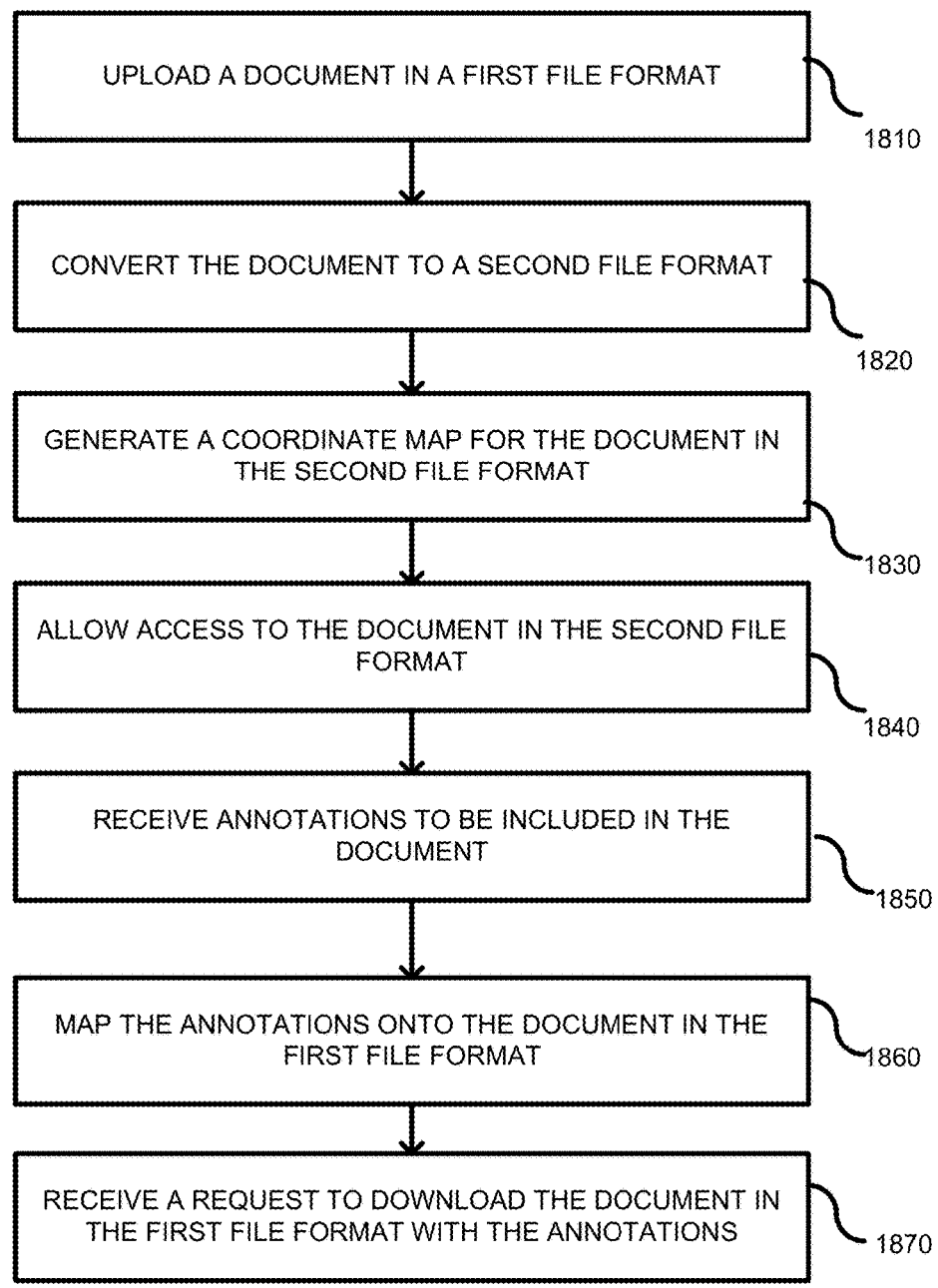
FIG. 18 is an overall flowchart according to one embodiment for inserting annotations into a text-based document.

FIG. 18 is a flowchart of an embodiment for inserting annotations into a text-based document. In process block 1810, a document is uploaded in a first file format. Generally, the first file format is a text-based format, but other formats can be used. The text-based format can typically have fonts associated therewith to be customized, such as by changing a font type, bolding, underlining, italicizing, etc. Examples of such documents include word processing documents, spreadsheets, etc. The uploading can occur from a client device to a service within a compute service provider. However, the terms "uploading" and "downloading" are considered to be actions taken by a server computer associated with the service described herein. In process block 1820, the document can be converted to a second file format. The second file format is a different format than the first file format. Example second file formats are fixed-layout formats, such as coordinate-based formats. In these formats, the content is typically an image and the image is not easily modifiable, such as by changing a font of the text, without using a photo editor. In process block 1830, a coordinate map is generated. The coordinate map can describe a bounding box for each word and object within the document in the second file format. For example, each word typically has two XY coordinates associated therewith to define a bounding box. In process block 1840, access is provided to documents in the second file format for document collaboration or for inserting annotations by the user that uploaded the document. Thus, users can access the document and submit annotations. In process block 1850, annotations can be received by the document annotation service. In process block 1860, annotations can be mapped into the document in the first file format using one of the strategies outlined above. To map the annotations, the document annotation service can first determine which strategy applies and then apply the rules associated with the strategy to insert the annotation. Mapping includes determining a location to insert the annotation so as to match the annotation's location between the second file format and the first file format. In process block 1870, a request can be received to download the document in the first file format with the annotations included. Typically, the user that uploaded the document can request the download after a comment period wherein other users can comment on the document. In some embodiments, the mapping can occur in response to the request to download instead of occurring prior to any request being made.

Figure 19:
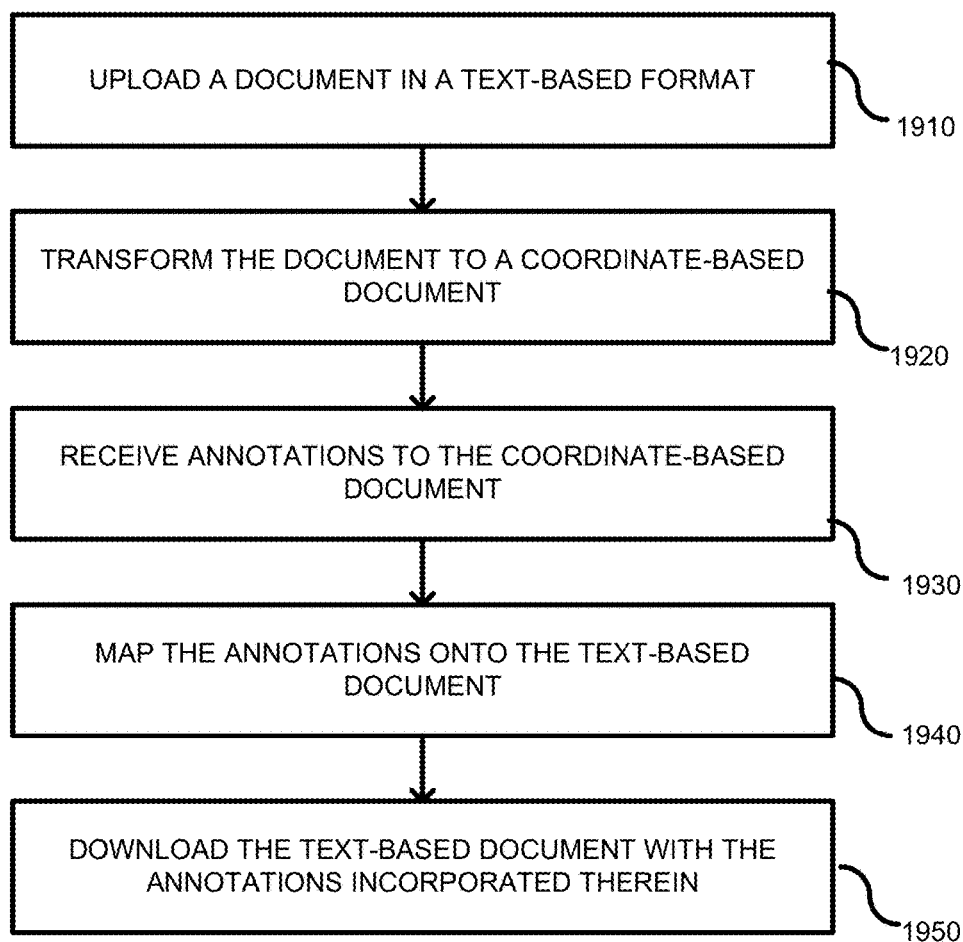
FIG. 19 is a flowchart according to another embodiment for inserting annotations into a text-based document.

FIG. 19 is a flowchart of another embodiment for inserting annotations into a text-based document. In process block 1910, a document is uploaded in a text-based format. In process block 1920, the document is transformed into a coordinate-based document, such as a pdf. In process block 1930, annotations are received for the coordinate-based document. The annotations can be stored in a database and exported to an annotation export file. In process block 1940, the annotations are mapped onto the text-based document. Typically, such a mapping is in response to a request to download the text-based document from the document annotation service. In response, the document annotation service can retrieve and map the annotations using one of the above-described strategies. In process block 1950, the text-based document can be downloaded to the user with the annotations incorporated therein. The user can thereby view the annotations inserted by other users that viewed the document in a different format. A practical example is for a user to upload a Word document, to receive annotations in a pdf version of the Word document, and then to download the Word document with the annotations inserted therein.

Figure 20:
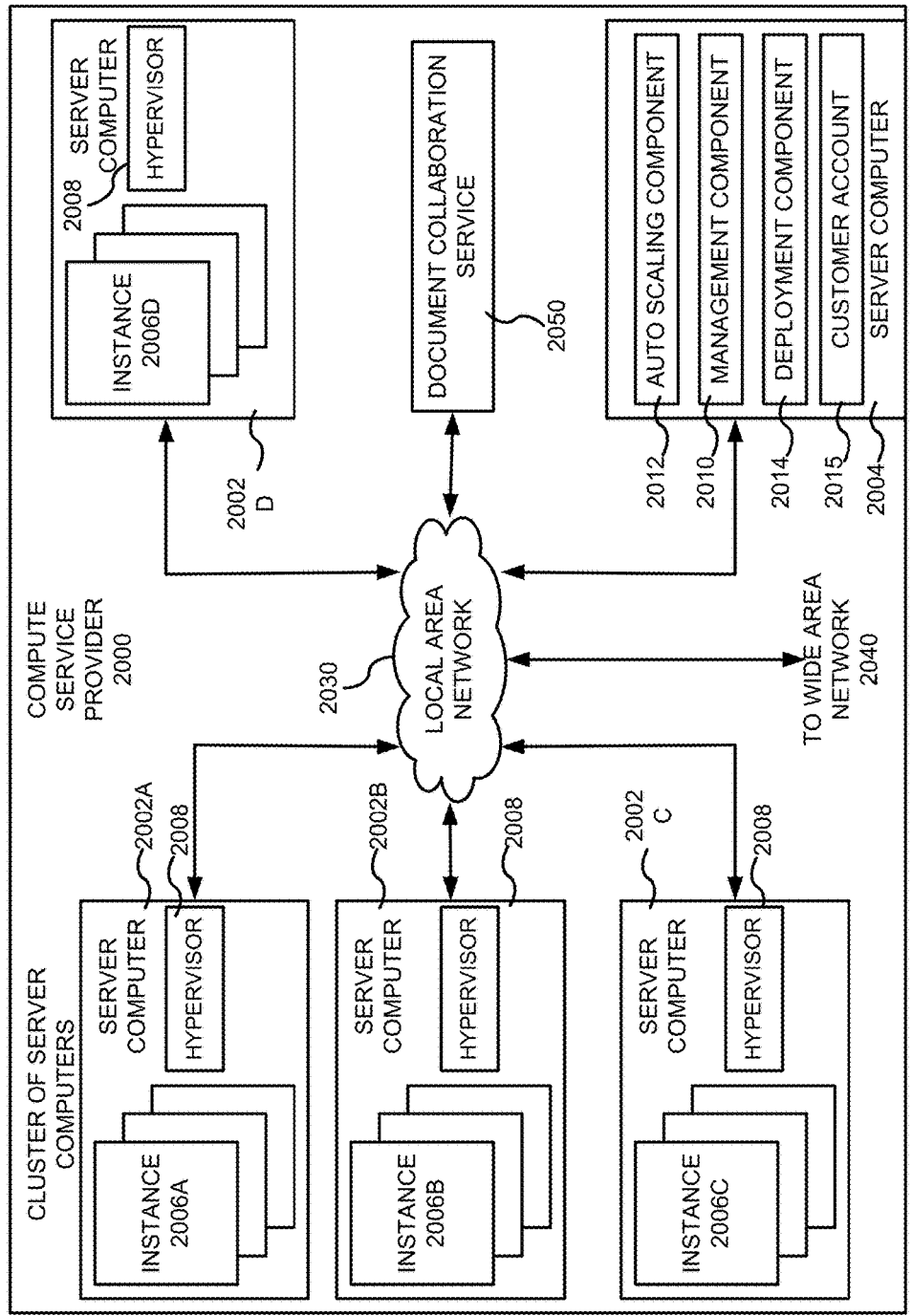
FIG. 20 is an example system diagram showing a plurality of virtual machine instances running in the multi-tenant environment.

FIG. 20 is a computing system diagram of a network-based compute service provider 2000 that illustrates one environment in which embodiments described herein can be used. By way of background, the compute service provider 2000 (i.e., the cloud provider) is capable of delivery of computing and storage capacity as a service to a community of end recipients. In an example embodiment, the compute service provider can be established for an organization by or on behalf of the organization. That is, the compute service provider 2000 may offer a "private cloud environment." In another embodiment, the compute service provider 2000 supports a multi-tenant environment, wherein a plurality of customers operate independently (i.e., a public cloud environment). Generally speaking, the compute service provider 2000 can provide the following models: Infrastructure as a Service ("IaaS"), Platform as a Service ("PaaS"), and/or Software as a Service ("SaaS"). Other models can be provided. For the IaaS model, the compute service provider 2000 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 2000 using networked client devices, such as desktop computers, laptops, tablets, smartphones, etc. running web browsers or other lightweight client applications. Those skilled in the art will recognize that the compute service provider 2000 can be described as a "cloud" environment.

The particular illustrated compute service provider 2000 includes a plurality of server computers 2002A-2002D. While only four server computers are shown, any number can be used, and large centers can include thousands of server computers. The server computers 2002A-2002D can provide computing resources for executing software instances 2006A-2006D. In one embodiment, the instances 2006A-2006D are virtual machines. As known in the art, a virtual machine is an instance of a software implementation of a machine (i.e. a computer) that executes applications like a physical machine. In the example of virtual machine, each of the servers 2002A-2002D can be configured to execute a hypervisor 2008 or another type of program configured to enable the execution of multiple instances 2006 on a single server. Additionally, each of the instances 2006 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 2004 can be reserved for executing software components for managing the operation of the server computers 2002 and the instances 2006. For example, the server computer 2004 can execute a management component 2010. A customer can access the management component 2010 to configure various aspects of the operation of the instances 2006 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 2012 can scale the instances 2006 based upon rules defined by the customer. In one embodiment, the auto scaling component 2012 allows a customer to specify scale-up rules for use in determining when new instances should be instantiated and scale-down rules for use in determining when existing instances should be terminated. The auto scaling component 2012 can consist of a number of subcomponents executing on different server computers 2002 or other computing devices. The auto scaling component 2012 can monitor available computing resources over an internal management network and modify resources available based on need.

A deployment component 2014 can be used to assist customers in the deployment of new instances 2006 of computing resources. The deployment component can have access to account information associated with the instances, such as who is the owner of the account, credit card information, country of the owner, etc. The deployment component 2014 can receive a configuration from a customer that includes data describing how new instances 2006 should be configured. For example, the configuration can specify one or more applications to be installed in new instances 2006, provide scripts and/or other types of code to be executed for configuring new instances 2006, provide cache logic specifying how an application cache should be prepared, and other types of information. The deployment component 2014 can utilize the customer-provided configuration and cache logic to configure, prime, and launch new instances 2006. The configuration, cache logic, and other information may be specified by a customer using the management component 2010 or by providing this information directly to the deployment component 2014. The instance manager can be considered part of the deployment component.

Customer account information 2015 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 2030 can be utilized to interconnect the server computers 2002A-2002D and the server computer 2004. The network 2030 can be a local area network (LAN) and can be connected to a Wide Area Network (WAN) 2040 so that end users can access the compute service provider 2000. It should be appreciated that the network topology illustrated in FIG. 20 has been simplified and that many more networks and networking devices can be utilized to interconnect the various computing systems disclosed herein.

As indicated, a document annotation service 2050 can be a cloud-based service and users can access documents shared in a multi-tenant environment.

Figure 21:
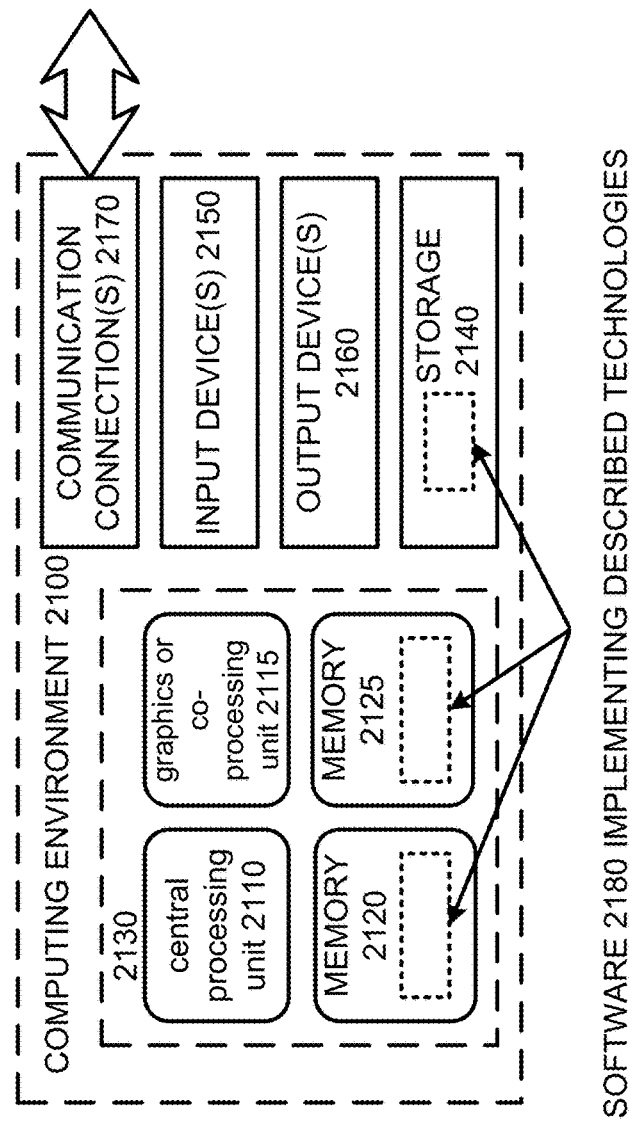
FIG. 21 depicts a generalized example of a suitable computing environment in which the described innovations may be implemented.

FIG. 21 depicts a generalized example of a suitable computing environment 2100 in which the described innovations may be implemented. The computing environment 2100 is not intended to suggest any limitation as to scope of use or functionality, as the innovations may be implemented in diverse general-purpose or special-purpose computing systems. For example, the computing environment 2100 can be any of a variety of computing devices (e.g., desktop computer, laptop computer, server computer, tablet computer, etc.)

With reference to FIG. 21, the computing environment 2100 includes one or more processing units 2110, 2115 and memory 2120, 2125. In FIG. 21, this basic configuration 2130 is included within a dashed line. The processing units 2110, 2115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 21 shows a central processing unit 2110 as well as a graphics processing unit or co-processing unit 2115. The tangible memory 2120, 2125 may be volatile memory (e.g., registers, cache, RAM), non-volatile memory (e.g., ROM, EEPROM, flash memory, etc.), or some combination of the two, accessible by the processing unit(s). The memory 2120, 2125 stores software 2180 implementing one or more innovations described herein, in the form of computer-executable instructions suitable for execution by the processing unit(s).

A computing system may have additional features. For example, the computing environment 2100 includes storage 2140, one or more input devices 2150, one or more output devices 2160, and one or more communication connections 2170. An interconnection mechanism (not shown) such as a bus, controller, or network interconnects the components of the computing environment 2100. Typically, operating system software (not shown) provides an operating environment for other software executing in the computing environment 2100, and coordinates activities of the components of the computing environment 2100.

The tangible storage 2140 may be removable or non-removable, and includes magnetic disks, magnetic tapes or cassettes, CD-ROMs, DVDs, or any other medium which can be used to store information in a non-transitory way and which can be accessed within the computing environment 2100. The storage 2140 stores instructions for the software 2180 implementing one or more innovations described herein.

The input device(s) 2150 may be a touch input device such as a keyboard, mouse, pen, or trackball, a voice input device, a scanning device, or another device that provides input to the computing environment 2100. The output device(s) 2160 may be a display, printer, speaker, CD-writer, or another device that provides output from the computing environment 2100.

The communication connection(s) 2170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

For example, although the annotations are described above through collaborations, the annotations can be made by the same user that uploaded the document to the service.

Furthermore, it should be recognized that the terms "includes" or "include" are synonymous with "comprise" and "comprises" and are open-ended terms that do not exclude additional, unrecited elements or method steps.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for document annotation operated by a compute service provider, comprising:
   receiving a document in a first file format at the compute service provider;
   converting the document to a second file format, different than the first file format;
   generating a coordinate map for the document in the second file format;
   allowing access to the document in the second file format;
   receiving annotations to be included in the document from the one or more users viewing the document in the second file format;
   converting the document back to the first file format by mapping the annotations onto the document in the first file format so that a user can view the document in the first file format with the received annotations; and
   receiving a request to download the document including the annotations in the first file format from the compute service provider;
   wherein the annotation is highlighted words and other objects, and wherein the first file format does not support highlighting the other objects, and wherein mapping the annotations includes searching for a group of words that are highlighted in the document in the second file format, searching for a matching group of words in the document in the first file format and highlighting the group of words in the document in the first file format and bypassing highlighting of the other objects.

2. The method of claim 1, wherein the first file format is a text-based format wherein fonts associated with text can be customized and the second file format is a fixed-layout format.

3. The method of claim 2, wherein the first file format is a DOM-based format and the fixed-layout format is a coordinate-based format.

4. The method of claim 1, where mapping the annotations onto the document includes obtaining text associated with the annotations and searching for the text associated with the annotations in the document in the first file format.

5. The method of claim 1, wherein the annotation includes a highlighted rectangular region and mapping the annotations includes using coordinates of the highlighted rectangular region to determine words and objects with intersecting coordinates in the document in the first file format and highlighting the determined words or objects in their entirety in the document in the first file format even when the determined words or objects are only partially highlighted in the document in the second file format.

6. The method of claim 1, wherein the annotation includes a highlighted region with no text or objects associated therewith and mapping the annotation includes inserting a comment field into the document in the first file format, the comment field being associated with a paragraph and placed at or near a top, bottom or middle point of the paragraph depending on a relative location of the highlighted region with respect to the paragraph.

7. A computer-readable storage, which is non-transitory, including instructions thereon for executing a method of annotating a document, the method comprising:
  receiving a text-based first document at a service;
  transforming the first document to a coordinate-based second document;
  receiving annotations to the second document, wherein the annotations include highlighted words or objects in the second document;
  mapping the annotations onto the first document so as to convert the annotations back to the text-based first document and wherein the mapping includes comparing coordinates of the highlighted words or objects in the second document to the words or objects that match in the first document and performing the highlighting only when the coordinates intersect;
  transmitting the first document with the annotations incorporated therein; and
  further including obtaining a first word and a last word of a highlighted region of the second document, performing string matches for the first and last words in the first document, and highlighting all highlightable words and objects between the first and last words, while bypassing objects that are not highlightable.

8. The computer-readable storage of claim 7, wherein mapping the annotations onto the first document includes determining words and/or objects that are highlighted in the second document, performing a word search in the first document for the determined highlighted words and/or objects to find matching words and/or objects and highlighting the matching words and/or objects in the first document.

9. The computer-readable storage of claim 7, wherein mapping the annotations includes mapping a highlighted rectangular region onto the first document by highlighting any words or objects in the first document that have at least a percentage portion thereof within the rectangular region.

10. The computer-readable storage of claim 8, further including converting a highlight that does not contain any words or objects to a comment in the first document.

11. The computer-readable storage of claim 10, further including placing the comment either adjacent a first line, a last line or in a middle of a paragraph depending on the relative location of the highlight with respect to the paragraph.

12. The computer-readable storage of claim 9, wherein individual words in the text-based document have a customizable format and the coordinate-based second document is a fixed-layout format.

13. The computer-readable storage of claim 10, further including generating an index file describing XY coordinates for each word and object in the coordinate-based second document.

14. A computer-readable storage, which is non-transitory, including instructions thereon for executing a method of annotating a document, the method comprising:
  uploading a text-based first document to a service;
  transforming the first document to a coordinate-based second document;
  receiving annotations to the second document;
  mapping the annotations onto the first document; and
  downloading the first document with the annotations incorporated therein;
  converting a highlight that does not contain any words or objects to a comment in the first document.

15. The computer-readable storage of claim 14, further including placing the comment either adjacent a first line, a last line or in a middle of a paragraph depending on the relative location of the highlight with respect to the paragraph.

16. The computer-readable storage of claim 15, wherein individual words in the text-based document have a customizable format and the coordinate-based second document is a fixed-layout format.

17. The computer-readable storage of claim 16, further including generating an index file describing XY coordinates for each word and object in the coordinate-based second document.

* * * * *